United States Patent
Kekre et al.

(10) Patent No.: US 7,313,724 B1
(45) Date of Patent: Dec. 25, 2007

(54) METHOD AND APPARATUS FOR SYNCHRONIZING REDUNDANT DATA WITH A VOLUME

(75) Inventors: Anand A. Kekre, Baner (IN); John A. Colgrove, Los Altos, CA (US); Oleg Kiselev, Palo Alto, CA (US); Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 497 days.

(21) Appl. No.: 10/882,631

(22) Filed: Jul. 1, 2004

(51) Int. Cl.
*G06F 11/00* (2006.01)

(52) U.S. Cl. ...................................................... 714/12

(58) Field of Classification Search .................. 714/12, 714/6, 7, 13, 15
See application file for complete search history.

(56) References Cited

U.S. PATENT DOCUMENTS

| | | | |
|---|---|---|---|
| 5,390,327 A | 2/1995 | Lubbers et al. ................ 714/7 |
| 5,590,276 A * | 12/1996 | Andrews ........................ 714/6 |
| 5,928,367 A * | 7/1999 | Nelson et al. .................. 714/6 |
| 6,725,392 B1 * | 4/2004 | Frey et al. ...................... 714/6 |
| 6,785,789 B1 | 8/2004 | Kekre et al. ................. 711/162 |
| 6,910,111 B1 | 6/2005 | Colgrove et al. ........... 711/162 |
| 6,912,631 B1 | 6/2005 | Kekre et al. ................. 711/162 |
| 6,996,687 B1 | 2/2006 | Kekre et al. ................. 711/162 |
| 7,206,863 B1 * | 4/2007 | Oliveira et al. ............. 709/245 |
| 2003/0159007 A1 | 8/2003 | Sawdon et al. ............. 711/154 |
| 2003/0212660 A1 * | 11/2003 | Kerwin .......................... 707/1 |
| 2003/0236944 A1 | 12/2003 | Thompson et al. ......... 711/114 |
| 2004/0039890 A1 | 2/2004 | Itoh et al. ................... 711/162 |
| 2004/0123031 A1 | 6/2004 | Kiselev et al. .............. 711/114 |

OTHER PUBLICATIONS

Kekre, Anand A., et al., pending U.S. Patent Application entitled "Method and Apparatus for Restoring a Corrupted Data Volume," U.S. Appl. No. 10/254,753; filed Sep. 25, 2002, including Specification: pp. 1-26; Drawings: Figures 1-10 on 7 sheets.

Ranade, Dilip, et al., pending U.S. Patent Application entitled "Replica Synchronization Using Copy-On-Read," U.S. Appl. No. 10/457,670; filed Jun. 9, 2003, including Specification: pp. 1-25; Drawings: Figures 1-5 on 5 sheets.

(Continued)

*Primary Examiner*—Nadeem Iqbal
(74) *Attorney, Agent, or Firm*—Campbell Stephenson LLP; Brenna A. Brock

(57) ABSTRACT

Various embodiments of systems and methods are disclosed for initially synchronizing redundant data (e.g., a mirror, a replica, or a set of parity information) with an original volume. State information identifies which regions of the original volume are currently valid, and only valid regions of the original volume are used to generate the values of the redundant data during the initial synchronization. For example, if the redundant data is a set of parity information, synchronizing the redundant data involves calculating one or more parity values based on the valid regions of the volume. If the redundant data is a duplicate copy (e.g., a mirror or replica) of the volume, synchronizing the redundant data involves copying the valid regions of the volume to the duplicate copy of the volume. If the original volume includes any invalid regions, unnecessary copying and/or processing for those regions can be avoided during the initial synchronization.

26 Claims, 13 Drawing Sheets

(Case 1: Mirrored Volume)

OTHER PUBLICATIONS

Kekre, Anand A., et al., pending U.S. Patent Application entitled "Method and Apparatus for Maintaining Information that Indicates Valid Regions of a Working Volume and Using that Information to Delay Volume Initialization," U.S. Appl. No. 10/882,612; filed Jun. 1, 2004, including Specification: pp. 1-30; Drawings: Figures 1-6 on 8 sheets.

ECC Technologies Inc., ECC FAQs, 2001, retrieved from the internet Apr. 27, 2007, http://members.aol.com/mnecctek/faqs.html.

The PC Guide, RAID Levels 1+5 (15) and 5+1 (51). Apr. 17, 2001, retrieved from internet Apr. 27, 2007, http://www.peguide.com/ref.hdd/perf/raid/levels/multLevel15-c.html.

* cited by examiner (Case 1: Mirrored Volume)

(Case 2: Mirrored volume that is initially zeroed)

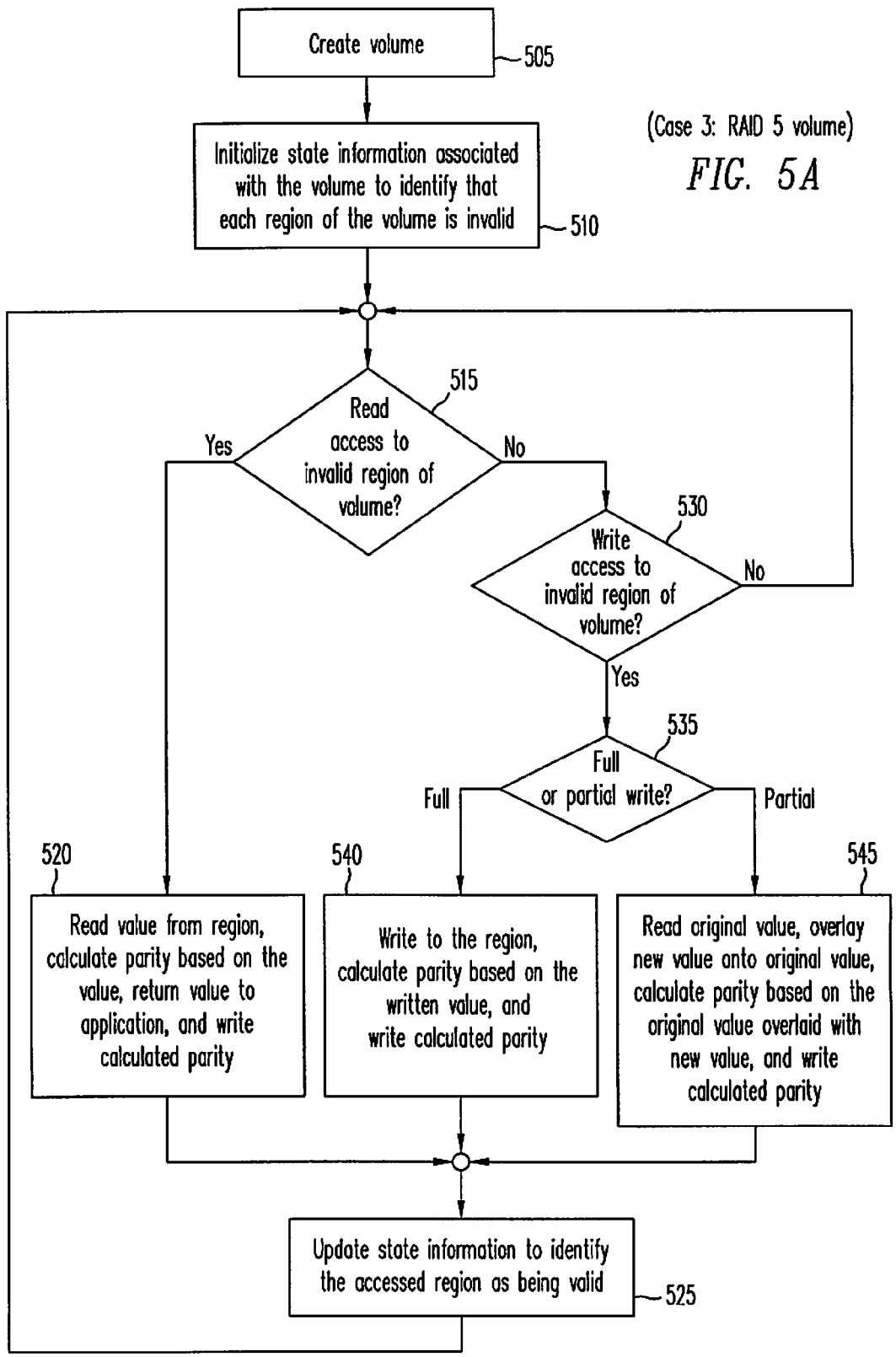
FIG. 5A (Case 3: RAID 5 volume)

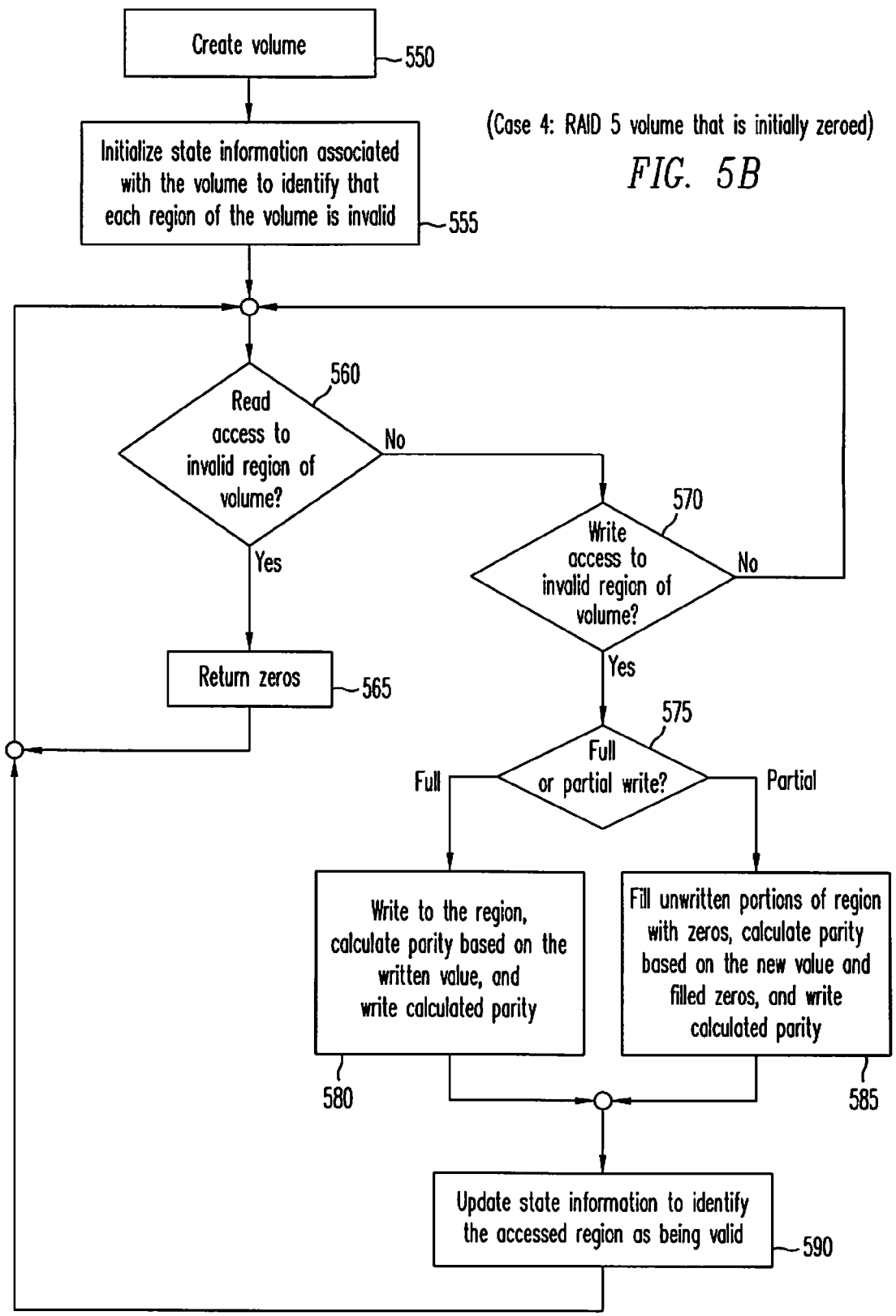

METHOD AND APPARATUS FOR SYNCHRONIZING REDUNDANT DATA WITH A VOLUME

FIELD OF THE INVENTION

This invention relates to data processing systems and, more particularly, to synchronizing redundant data, which adds a level of redundancy to a volume, with the volume.

BACKGROUND

Applications access data that is stored on a persistent storage device, such as a disk drive or an array of disk drives. Redundant data, such as a duplicate copy of the application data or parity associated with the application data, is often maintained in order to provide improved availability and/or performance. For example, a set of parity information that can be used to recover application data within a volume is often maintained as part of the volume. The parity information can be maintained according to one of several different Redundant Array of Independent Disk (RAID) techniques. For example, RAID 5 arrays compute parity on an application-specific block size, called an interleave or stripe unit, which is a fixed-size data region that is accessed contiguously. All stripe units in the same stripe (i.e., all stripe units at the same depth or altitude on each drive) are used to compute a respective parity value. RAID 5 rotates the storage of the parity values across all drives in the set.

Another example of redundant data is a duplicate copy. Duplicate copies of the same data are often stored in the form of mirrors (e.g., according to RAID 1 techniques). While multiple copies of the data are available, an application's accesses to the data can be interleaved across multiple copies, providing increased access performance. If one copy of the data is damaged, an application can continue to access the data in one of the other copies and at the same time recover from the loss of redundancy.

A duplicate copy of the data can be maintained at a remote site (such a duplicate copy is referred to as a replica), which is typically geographically separated from the location of the data, in order to protect against data loss due to disaster at one site. If the data at one site is corrupted or lost, the copy of the data at the other site can be used. Hence, redundant data (e.g., in the form of a duplicate copy) can be located on the same site as the primary data or on a separate site than the primary data.

When redundant data is created, the redundant data needs to be synchronized with the original application data in the volume. This process is called initial synchronization. The redundant data is considered to be synchronized with the original when the data in the redundant data provides either a full copy of a valid state of the original data volume or information (like parity) that can be used to recover the valid state of the original data volume at a given point in time. Many times, redundant data is created after an application has already begun using the original volume. The redundant data can be synchronized by accessing data from a backup or other point-in-time copy of the original volume, or by accessing data directly from the original volume itself.

After the initial synchronization, a process operates to maintain synchronization between the redundant data and the original. For example, if the redundant data is a replica (i.e., a duplicate copy maintained at a remote location), a replication process tracks application writes to the original and routinely applies these application writes to the replica. Similarly, if the redundant data is a mirror, a process ensures that a write to the original does not complete until the write has also been applied to the mirror. If the redundant copy is a set of parity information (e.g., a parity column in RAID 5), a process ensures that a write to the original does not complete until an appropriate parity value within the set of parity information has been recomputed.

The initial synchronization process typically consumes a large amount of time and/or resources. For example, when a replica is created at a remote site, a tape backup of the original is transported to the remote site and then copied to the replica. Due to transportation delays, it may take several days before the replica is initially synchronized with respect to the primary. Alternatively, if the data is copied to the replica via a network, the initial synchronization can consume an enormous amount of network capacity and time. Initial synchronization of RAID volumes requires additional I/O and CPU cycles in order to calculate parity values. It is desirable to be able to reduce the amount of time and/or resources required to initially synchronize redundant data with an original volume.

SUMMARY OF THE INVENTION

Various embodiments of systems and methods are disclosed for initially synchronizing redundant data with an original volume. State information identifies which regions of the original volume are currently valid, and only valid regions of the original volume are used to generate the values of the redundant data during the initial synchronization. Accordingly, if the original volume includes any invalid regions, unnecessary copying and/or processing can be avoided.

In one embodiment, a method involves accessing state information associated with a volume and initiating synchronization of redundant data with one or more valid regions of the volume. The redundant data adds a redundancy level to the volume (e.g., the redundant data can be a replica maintained at a remote site or a mirror or set of parity information generated according to one of various RAID techniques). The state information indicates which regions of the volume are the valid regions. The method can additionally involve identifying the redundant data as being out of synchronization with respect to application data in the volume, while the synchronization is performed. If the redundant data is a set of parity information, synchronizing the redundant data involves calculating one or more parity values based on the valid regions of the volume. If the redundant data is a duplicate copy (e.g., a mirror or replica) of the volume, synchronizing the redundant data involves copying the valid regions of the volume to the duplicate copy of the volume.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 5A is a flowchart of a method of tracking the valid regions of a RAID 5 volume.

FIG. 5B is a flowchart of another method of tracking the valid regions of a RAID 5 volume.

Figure 1:
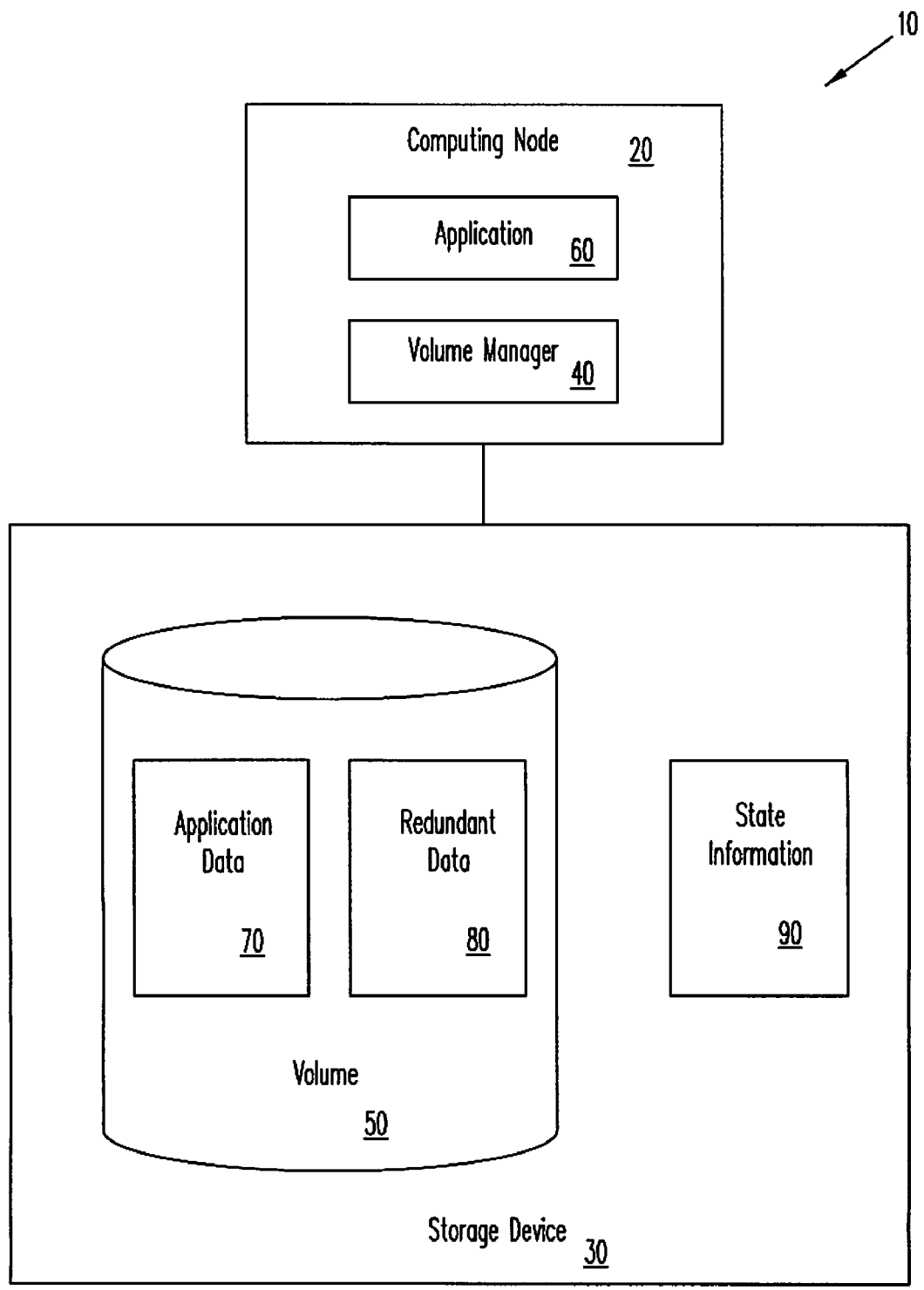
FIG. 1 shows a data processing system that includes a mechanism for tracking the state of each region of a working volume.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Using State Information to Track Valid Regions of a Volume

State information associated with a working volume is used to track the valid data on the working volume. For example, the state information can be maintained in a bitmap that includes (at least) one bit for each region of a working volume. The value of each bit indicates whether a respective region currently stores valid data. Similarly, the state information can be maintained in an extent map that includes a list of extents, which specifies the starting offset and ending offset (or starting offset and length), as well as whether the specified extent currently stores valid data, for each of the extents. Whenever the state information identifies a particular region as storing valid data, the redundant data included in and/or associated with the application data in that region is guaranteed to be synchronized with the application data. By keeping track of the valid data on the working volume, initial synchronization of the supplemental data in the working volume can be avoided. For example, if the working volume includes two or more mirrors, these mirrors do not need to be initially synchronized with each other. Similarly, if the working volume is implemented as a RAID 5 volume, initial parity calculation for the working volume can be avoided.

FIG. 1 shows a block diagram of a data processing system. In this example, data processing system 10 includes computing node 20 and storage device 30. Computing node 20 is a computing device, such as a server, workstation, personal computer, personal digital assistant (PDA), laptop computer, cell phone, network switch, storage device controller, storage appliance, storage switch, or the like.

Storage device 30 represents one or more physical storage devices. A physical storage device can be a single device (e.g., a single hard drive, CD (Compact Disc) drive, or DVD (Digital Versatile Disc) drive). Alternatively, a storage device may include several such devices (e.g., storage device 30 can be a RAID array of several hard drives controlled by a hardware array controller).

Computing node 20 implements volume manager 40. Volume manager 40 is a storage virtualization component such as VERITAS Volume Manager™. A virtualization component, which can be implemented in hardware, software, or a combination of the two, creates and manages one or more logical storage devices, called volumes, such as volume 50. The virtualization component can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

In this example, computing node 20 also implements application 60 (e.g., a file system or database), which accesses data in volume 50 by sending volume manager 40 read and/or write requests to perform corresponding read and/or write operations to the volume. Volume manager 40 then performs the requested read and/or write operations (e.g., by performing one or more read and/or write accesses to volume 50). Volume 50 is the working volume for application 60. In other words, volume 50 stores the data that is actively being accessed by application 60. Other volumes (e.g., replicated volumes, not shown) can also store copies of the data in volume 50; however, these other volumes are not directly accessed by application 60, since volume 50 is the working volume. While application 60 is shown as part of computing node 20, it is noted that application 60 can also be implemented on other nodes (e.g., application 60 could be implemented on a client computing node that accesses volume 50 via a computing node 20).

In one embodiment, volume manager 40 and application 60 are implemented in software, executed by computing node 20. Volume manager 40 and application 60 can each alternatively be implemented in hardware. For example, computing node 20 can include a logic device (e.g., an Application Specific Integrated Circuit (ASIC), Programmable Logic Device (PLD), or the like) configured to perform the functions of application 60 and/or volume manager 40. Computing node 20 can also be implemented using hardware that is configured to perform some of the functions of application 60 and/or volume manager 40 and that are also configured to execute software implementing other functions of application 60 and/or volume manager 40.

Volume manager 40 controls access to volume 50. Volume 50 includes application data 70 and redundant data 80. Application data 70 includes the data that is accessed by application 60. Redundant data 80 includes data that can be used to recover application data 70 if application data 70 is corrupted. For example, redundant data 80 can be a mirrored copy of application data 70 (in the case of mirrored copies, each copy is considered to be redundant data with respect to the other copy). Accordingly, volume manager 40 may also access the redundant data to satisfy application read requests. Alternatively, redundant data 80 can be parity data associated with application data 70. For example, if volume 50 is a RAID 5 volume, redundant data 80 includes the parity data. Parity can also be used to recover application data 70 if application data 70 is corrupted.

Volume manager 40 also maintains state information 90 for volume 50. Volume manager 40 consolidates state information 90 (e.g., by storing the state information 90 within a bitmap or extent map) and associates the consolidated state information with volume 50. In the illustrated example, state information 90 is stored separately from volume 50. It is noted that state information 90 is included in volume 50 in alternative embodiments.

State information 90 identifies the state of each region of volume 50. Regions of volume 50 can be in bytes, blocks, or extents (i.e., ranges of data specified by a starting address and a length or by a starting address and an ending address). The size of each region can be constant or variable. The regions can be contiguous or non-contiguous on the underlying storage device.

State information 90 indicates whether each region of volume 50 has valid contents. A valid region is a region that contains valid application data. Application data is valid if application 60 has written or read a particular value of that application data. The values of valid regions should remain consistent with the values that application 60 expects those regions to store. For example, if application 60 has written a value to a region, application 60 should receive that value the next time application 60 reads from the region. In contrast, it is not necessary for invalid regions of application data to have any particular value.

If application data is valid, the redundant data associated with that application data needs to be synchronized with the application data so that the redundant data can be used to recover the application data, if necessary. If application data is invalid, however, the value of the application data is not critical to maintaining consistency. If application 60 has not written valid data to a particular region, the application 60 will not expect to read anything useful when the application reads from that region. Therefore, since the operation of application 60 will not be affected by changes in value of invalid regions, it is not necessary to keep the application data and redundant data synchronized for invalid regions of the volume. In other words, if the application data in an invalid region is modified, there is no need to use the redundant data to recover a particular value of the invalid region (i.e., there is no need to store consistent values in such regions).

Since it is not necessary to synchronize the redundant data with invalid application data, and since state information 90 indicates which regions of the volume are valid, there is no need to synchronize all of the redundant data in volume 50 when volume 50 is created. Avoiding the synchronization of invalid application data with redundant data can significantly reduce the amount of time and/or resources needed to create a volume. Often, applications only use a portion of a volume. For example, a file-system may only use half of a mirrored volume (e.g., only 500 GB of a 1 TB volume may be used). If it is not necessary to synchronize all of the redundant data, a significant amount of I/O activity is avoided (e.g., only reads and writes needed to synchronize 500 GB of the 1TB volume needs to be performed).

In one embodiment, state information 90 is maintained as a bitmap that includes one bit per region of volume 50. The value of a particular bit within the bitmap identifies whether a respective region is valid (e.g., in one embodiment, if the bit is set, the respective region is valid; if the bit is cleared, the respective region is invalid). In other embodiments, more than one bit of state information is maintained per region of volume 50. For example, in one embodiment, two bits are maintained per region. One bit identifies whether the associated region is valid, while the other bit identifies whether the associated region has been modified subsequent to a particular point in time. It is noted that other types of state information can be maintained instead of and/or in addition to information regarding validity and/or modification. Similarly, state information 90 can be maintained in structures other than bitmaps. For example, in one embodiment, state information 90 indicates which regions of volume 50 are valid by listing each valid region of volume 50 (e.g., the listing can specify the starting Logical Block Address (LBA) of each valid region). In another embodiment, state information 90 indicates which regions of volume 50 are valid by listing each invalid region of volume 50 (such that all non-listed regions are considered to be valid). In yet another embodiment, the state information 90 indicates which extents (specified by either a starting and an ending offset or a starting offset and a length) of volume 50 are valid or invalid by listing the extents of volume 50 and then indicating whether each listed extent is valid.

Volume manager 40 updates state information 90 in response to accesses to volume 50. As the application data in particular regions of volume 50 is accessed, and as the redundant data associated with the application data in those regions is synchronized with the redundant data, volume manager 40 updates state information 90 to indicate that those regions contain valid application data.

Volume manager 40 also uses state information 90 to determine how to handle various read and write requests to volume 50. When read or write requests specifying valid regions of volume 50 are received from application 60, volume manager 40 performs the corresponding read or write operations to volume 50 normally (e.g., a read or write access to a valid region does not cause a change in state information 90, and redundant data 80 is only modified in response to write accesses to application data 70). Since the synchronization of redundant data with application data in invalid regions is delayed until the time the application data in an invalid region is first accessed, accesses to invalid regions of volume 50 are handled differently than accesses to valid regions. For example, if volume manager 40 receives a request to read a particular region of volume 50, and if state information 90 identifies that region as being invalid, volume manager 40 can synchronize the redundant data with the application data in the invalid region as part of and/or subsequent to performance of the read operation. After the read operation has been performed and the redundant data has been synchronized with the associated application data in the invalid region, volume manager 40 updates state information 90 to indicate that the region is valid. As another example, if application data 70 is corrupted and volume manager 40 uses redundant data 80 to recover application data 70, volume manager can selectively only recover the portions of application data 70 that are identified as being valid in state information 90. This can decrease the amount of time and/or resources needed to recover application data 70. More examples of how various accesses to invalid regions of a volume are handled are provided below.

Figure 2A:
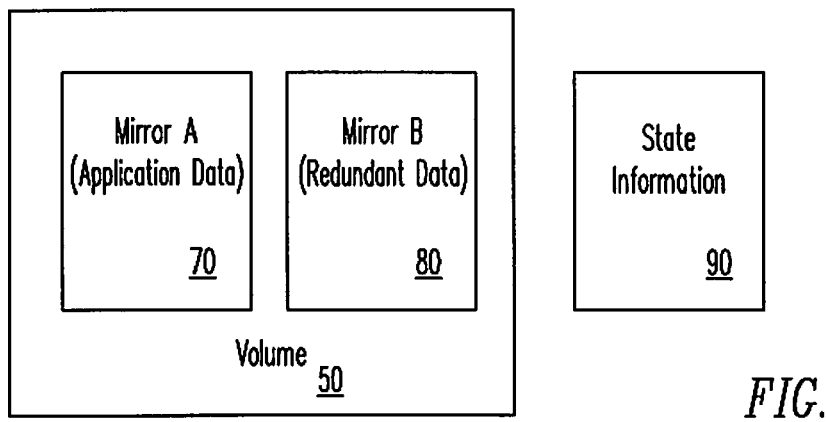
FIGS. 2A-2D show an example of how state information is maintained for regions of a mirrored volume.

FIGS. 2A-2D show an example of a mirrored volume and the state information associated with that mirrored volume. As shown in FIG. 2A, volume 50 includes two mirrors:

mirror A and mirror B. Each mirror stores application data while also providing redundant data for the other mirror. State information 90 associated with volume 50 identifies the state of each region of volume 50.

Figure 2B:
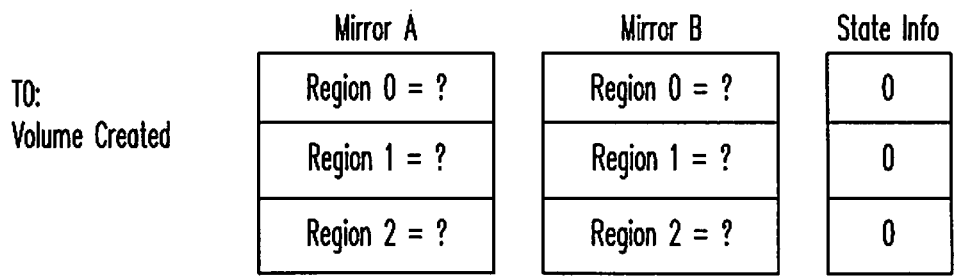

FIG. 2B illustrates the initial state of volume 50 at the time T0, which is the time at which volume 50 is created. To simplify this example, only three regions 0-2 of volume 50 are shown; however, a typical volume will include more than three regions. In this example, state information 90 includes one bit per region of volume 50. If a bit is set to a binary value of 1, the corresponding region of volume 50 is valid. If instead a bit is cleared (i.e., if the bit is set to a binary value of 0), the corresponding region of volume 50 is invalid. As shown, each region of volume 50 is initially identified as being invalid by state information 90. The value of each region is identified by a question mark, indicating that the value of each region is indeterminate.

Figure 2C:
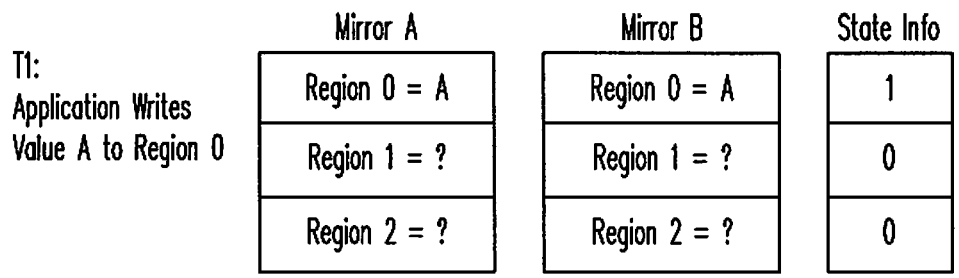

FIG. 2C illustrates volume 50 and state information 90 at time T1, when an application writes value "A" to region 0 of volume 50. The write operation to region 0 is performed to both mirrors of volume 50, and accordingly the value of region 0 of each mirror is shown as being "A". Since region 0 has been updated by the application, state information 90 is updated to indicate that region 0 is valid by updating the value of the bit associated with region 0 to have a binary value of 1.

While the illustrated example shows the situation in which the entire value of region 0 is updated (i.e., each bit within region 0 is written to), other situations occur in which less than all of region 0 is updated by a write. For example, if region 0 is eight bytes in size, an application can write to a single byte within region 0 (such a situation is referred to as a "partial write"). When a partial write occurs, the volume manager can read the unmodified portions of region 0 from one of the mirrors and write those values to the other mirror in order to synchronize the two mirrors. After the redundant data is synchronized with region 0, the volume manager updates the state information 90 to indicate that the region is valid.

Figure 2D:
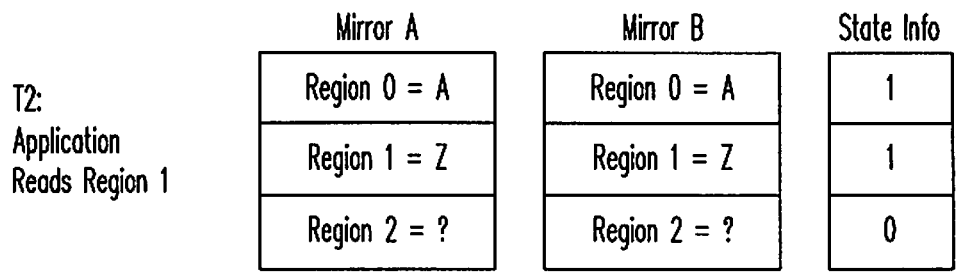

FIG. 2D shows volume 50 and state information 90 at time T2, when the application reads from region 1 of volume 50. In this example, the initial value "Z" of region 1 of one of the mirrors is read from the volume and returned to the application. To synchronize the two volumes, this value "Z" is then written to region 1 of the other mirror, such that the value of region 1 of both mirrors is Z. In response to the application accessing region 1, and in response to the redundant data being synchronized to the application data in region 1 (by synchronizing the values of region 1 of both mirrors), state information 90 is updated to indicate that region 1 is valid. If the read request only reads a portion of the region, the volume manager can read the value of the entire region from one mirror and write that value to the other mirror in order to synchronize the mirrors. When the accessed region of the mirrors is synchronized, the state information is updated to indicate that the region is valid. The value of the portion of the region that was specified in the read request is returned to the application after the state information is updated. In some embodiments, the accessed region may be temporarily locked for other accesses while the redundant information for the accessed region is being synchronized, and the read operation may not be completed until the state information for the region is updated. This assures consistency of read data in environments where multiple applications may issue simultaneous read requests for the same data.

Figure 3A:
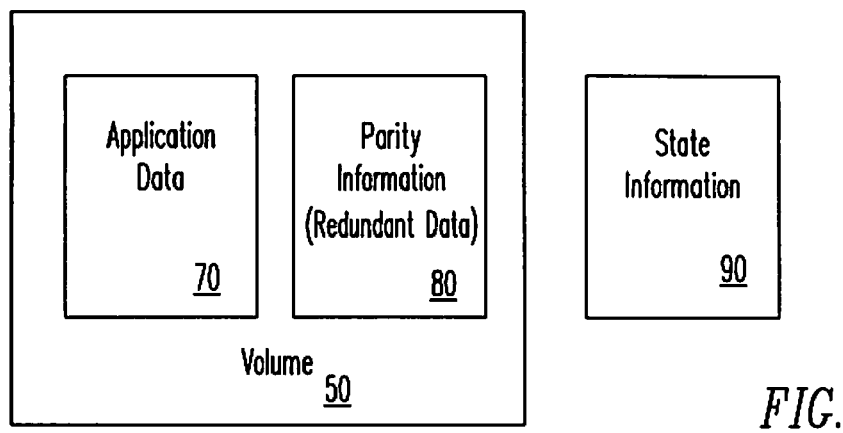
FIGS. 3A-3D show an example of how state information is maintained for regions of a RAID 5 volume.

FIGS. 3A-3D show another example of a volume and the state information associated with that volume. In this example, volume 50 is implemented as a RAID 5 volume. As shown in FIG. 3A, volume 50 includes application data and parity information, which is redundant data that can be used to recover application data if some of the application data is corrupted or lost.

Figure 3B:
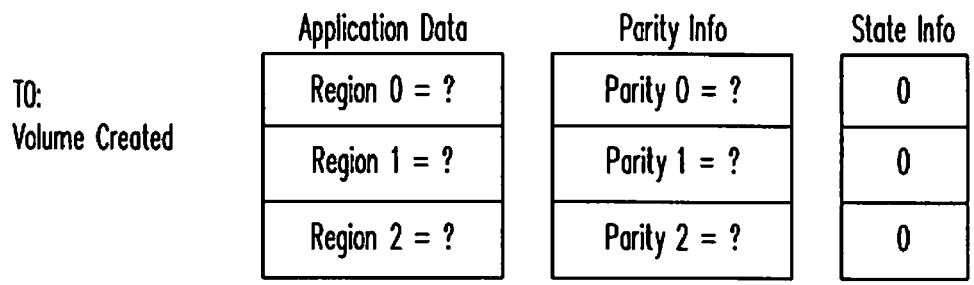
Figure 3C:
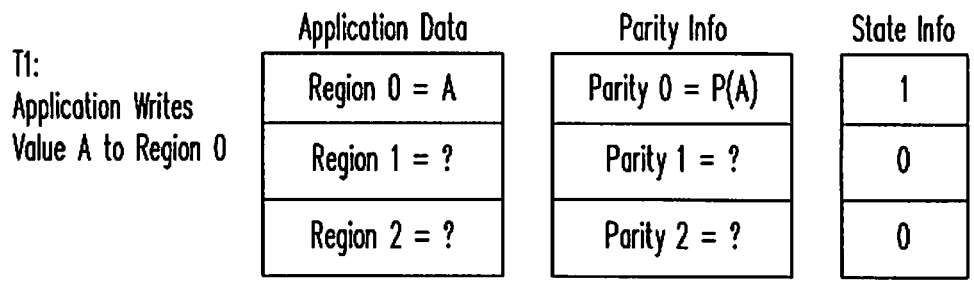
Figure 3D:
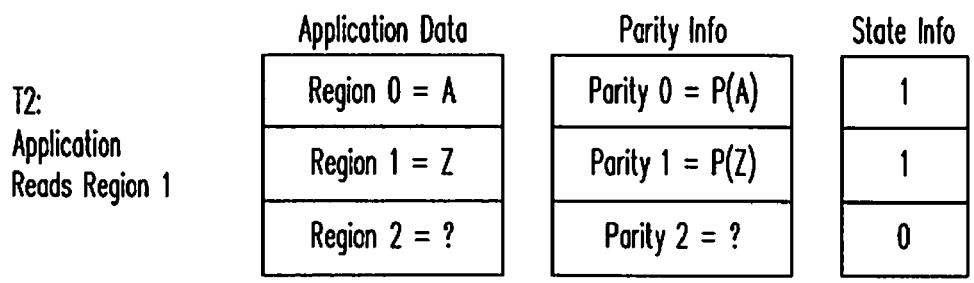

FIGS. 3B-3D illustrate several regions of the RAID 5 volume (for simplicity, only three regions are shown in this example; however, it is noted that a RAID 5 volume can include significantly more than three regions). Each region includes application data and parity information, and one bit of state information is maintained for each region (associated application data, parity information, and state information are shown in the same row of FIGS. 3B-3D). While the parity information is illustrated in a single column in FIGS. 3B-3D, it is noted that the parity information is actually interspersed with the application data throughout the RAID 5 volume.

FIG. 3B illustrates the RAID 5 volume at time T0, when the volume is created. At this time, the value of each region of the volume is indeterminate, and the state information identifies each region as being invalid. The parity information is not synchronized with the application data. In other words, the value of the parity information has not been calculated from the actual value of the corresponding application data, and thus the parity information cannot be used to detect errors in or correct the application data.

FIG. 3C illustrates the RAID 5 volume at time T1. At time T1, an application generates a write request to perform a complete write (also referred to as a full write) to region 0, in order to write value "A" to the application data in region 0 of the RAID 5 volume. As part of the write operation, the volume manager of the RAID 5 volume calculates the parity, P(A), of the new value "A" of region 0 and writes this value to the parity information associated with the application data in region 0. As a result, the redundant data is synchronized to the application data in region 0. The state information is updated to indicate that region 0 is valid.

If the write request to region 0 is not a complete write (i.e., if the write request updates less than the entire portion of the application data in region 1), the volume manager reads the original value of the unwritten portion of the application data in region 1 and uses that value, along with value "A", to calculate the parity of region 1. For example, assume "A" is one byte in length and is being written to the first byte of application data in region 1. If there are eight bytes of application data in region 1 and the eight bytes have initial values of "L", "M", "N", "O", "P", "Q", "R", and "S" respectively, the values of the eight bytes after the write are "A", "M", "N", "O", "P", "Q", "R", and "S" respectively. These values are then used to calculate the parity of region one.

FIG. 3D illustrates the RAID 5 volume at time T2, when an application generates a read request to region 1. In this example, the initial value of the application data in region 1 is "Z". When the application generates the read request to region 1, the value of region 1 is accessed and returned to the application. The value Z of region 1 is also used to calculate the parity P(Z) of region 1. The calculated parity value is written to the parity information associated with the application data in region 1. Since the parity information is now synchronized with the application data in region 1, the state information is updated to indicate that region 1 is valid. If the read request specifies only to a portion of the region, the entire region is read and the parity associated with that region is synchronized. The value of the portion of the region that is requested by the application is returned to the application after the state information is updated.

Figure 4A:
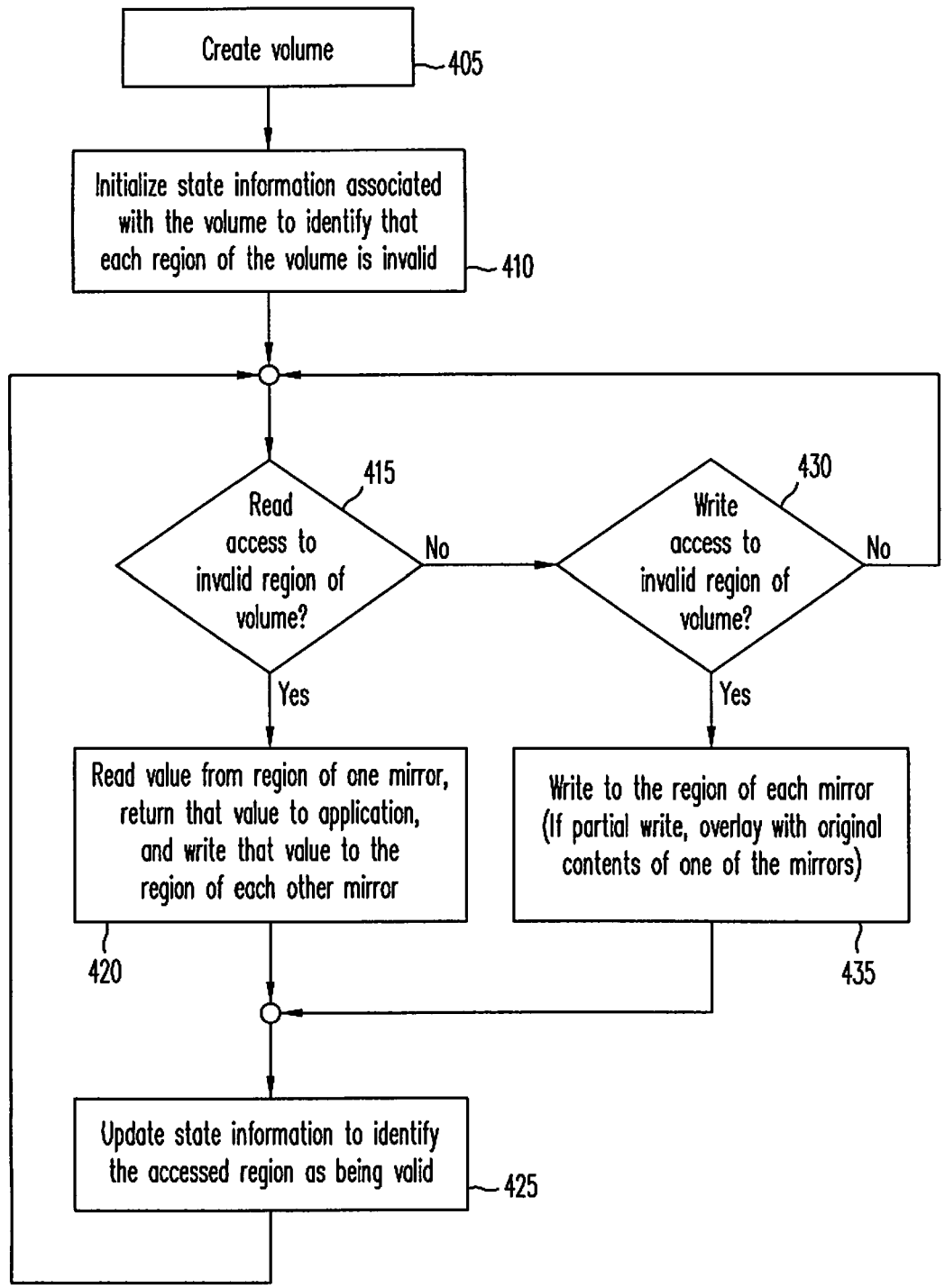
FIG. 4A is a flowchart of a method of tracking the valid regions of a mirrored volume.

FIG. 4A is a flowchart of a method of tracking the valid regions of a mirrored volume. As noted above, a mirrored volume stores application data (in one of the mirrors) as well as redundant data (in another mirror) that can be used as a substitute for the application data if the application data is corrupted. At 405, the mirrored volume is created. Creation of the mirrored volume can involve allocating portions of one or more storage devices for use as the mirrored volume and mapping logical blocks of the mirrored volume to physical locations of the storage devices.

In this embodiment, this initial synchronization between the mirrors is not performed. Consistency problems that could otherwise arise due to not performing the initial synchronization are avoided by maintaining state information for the mirrored volume, as described below.

State information associated with the volume is initialized to indicate that each region of the volume is invalid, as shown at 410. Initializing the state information can involve writing a particular value to each bit within a bitmap. Each bit represents a different region of the volume, and the value of each bit indicates whether the represented region is valid or not. It is noted that function 410 can be performed at substantially the same time as function 405.

If a read access (e.g., performed as part of a read operation, initiated in response to a read request generated by an application) to an invalid region of the volume is detected, the value of the invalid region on one of the mirrors is read, as indicated at 415 and 420. In one embodiment, one of the mirrors is selected as a default mirror, and the default mirror is used to supply the values of invalid regions. In other embodiments, the mirror from which to read the value of the invalid region is selected dynamically for each read operation. For example, the mirror from which to read the value can be selected based on current access patterns to the volume in order to balance the I/O activity between mirrors, based on calculation of the disk drives' mechanical behaviors (e.g., read head positioning relative to the location of the region on the disk currently being read), based on the knowledge of caching characteristics of the storage devices where the volume is located, or simply based on random selection.

As shown at 420, the value that is read from the invalid region of one of the mirrors is returned to the application that initiated the read access. Additionally, this value of the accessed region is written to the same region of each of the other mirrors, effectively synchronizing the redundant data in this region of the volume with the application data in the region. It is noted that even if the read access is a partial read (i.e., if the read access accesses less than all of the data stored in the region), the entire value of the region is still read so that synchronization can be performed. In response to the redundant data in the region being synchronized with the application data, the state information is updated to indicate that the region is a valid region, as shown at 425. After the state information is updated, the value of the region (or of an appropriate portion of the region) is returned to the application that initiated the read access, as indicated at 430.

If a write access to an invalid region is detected (e.g., performed as part of a write operation, initiated in response to a write request generated by an application), as shown at 435, the invalid region is updated with the value supplied as part of the write access, as indicated at 440. If the write access is a partial write access that will write only a portion of the invalid region (e.g., if the region spans a block, but the write access is only updating one byte within the block), the original value of the region on one of the mirrors is read. This value is overlaid with the value being written. After the value being written is overlaid with the values read from one of the mirrors, the resulting value is written to the region on each of the other mirrors, such that the region has the same value on all of the mirrors. For example, if the region includes eight bytes, bytes 0-7, and the write access is updating byte 4, the value of bytes 0-7 (or simply the value of bytes 0-3 and 5-7) is read from a selected one of the mirrors. The values of bytes 0-3 and 5-7 that were read from the selected mirror are then written to corresponding bytes 0-3 and 5-7 of each other mirror, while the new value (supplied by the write access) of byte 4 is written to each of the other mirrors. The original value of the region on the selected mirror can be read before or after the write is performed to the selected mirror. As before, the mirror from which to read the original value of the region can be selected in a variety of different ways.

After the write access is performed to the invalid region, as shown at 440, the region has the same value on each of the mirrors and the regions are synchronized. In response to the write access, the state information is updated to indicate that the accessed region is valid, as shown at 445.

Figure 4B:
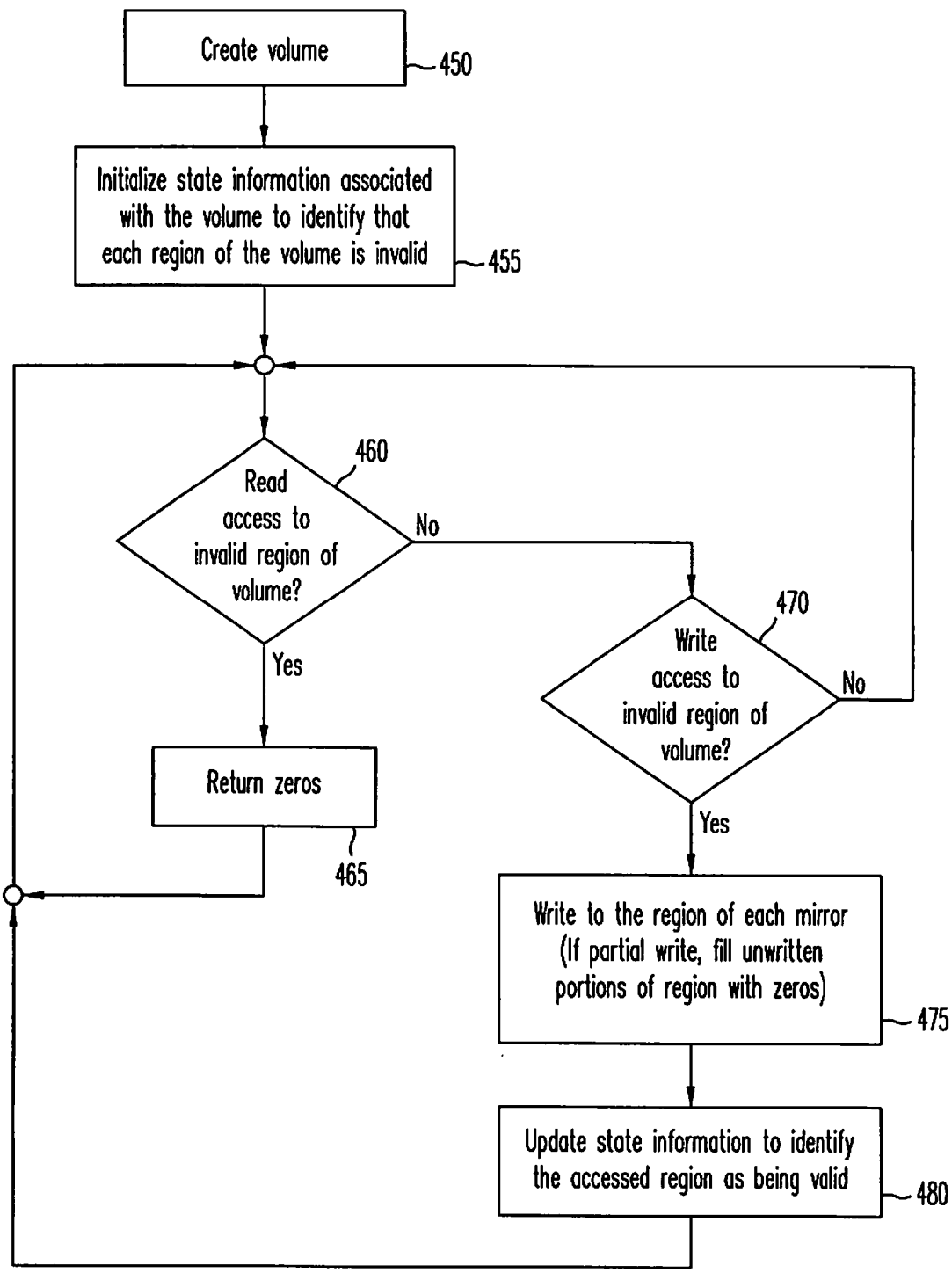
FIG. 4B is a flowchart of another method of tracking the valid regions of a mirrored volume.

FIG. 4B is a flowchart of another method of tracking the valid regions of a mirrored volume. In this example, the volume manager controls accesses to the volume such that each bit in the volume is initialized to a binary value of zero.

At 450, the volume is created. Normally, creation of the volume may involve writing a value of zero to each bit within the volume. In such a case, the volume would not be accessible until each bit had been written. However, in this example, the process of writing a value of zero to each bit within the volume is not performed when the volume is created. Instead, writing zero to a particular region of the volume is delayed until the first read or write request specifying that region is received from the application.

At 455, state information associated with the volume is initialized to a value that identifies each region of the volume as being invalid. As noted above, initializing the state information can involve setting each bit within a bitmap to a particular value (e.g., binary 0). Function 455 is performed at substantially the same time as function 450, in some embodiments.

In the illustrated embodiment, if a read access is addressed to an invalid region of the volume, as detected at 460, zeros are returned to the application that initiated the read access. For example, if the application reads a byte of an invalid region, the application will receive "00000000". Thus, even though the volume has not been initialized to zeros by writing a zero to each bit of the volume, an application will nevertheless receive the appropriate values when accessing the volume. While all zeros are returned to the application in this example, other embodiments return other values to the application when the application reads an invalid region. In general, a default value of the invalid region (or portion of the invalid region) being read is returned to the application. As shown in the example of FIG. 4B, the default value can be zero. In other embodiments the default data returned from reading an invalid region can include other values. For example, at the byte level, values such as 0xFF in hexadecimal ("hex") or 11111111 in binary can be used as default values. At the word level, default hex values can include values that are selected to be visually recognizable as invalid (e.g., 0xCAFEBABE, 0xDEAD-BEEF, or 0xFEFEFEFE).

In the embodiment illustrated in FIG. 4B, the invalid region accessed by the read is not validated in response to the read. Accordingly, in this embodiment, when the application reads an invalid region, no access is actually performed to that region of the volume. Instead, the volume manager generates the appropriate value to return to the application, in response to the state information indicating that the region is invalid. The state information is not updated in response to completion of the read access.

In alternative embodiments, the region accessed by the read is updated in response to the read. For example, in one such embodiment, when an application reads from an invalid region of the volume, the volume manager detects that the region is invalid (based on the state information) and generates the appropriate value to return to the application, without first accessing the region of the volume. In one embodiment the volume manager then writes a zero to each bit within the region (on each mirror) that is addressed by the read access. This write is performed before completion of the read access. After the value of the region has been updated on each of the mirrors, such that the region is synchronized on each of the mirrors, the volume manager updates the state information to indicate that the region is valid region. Once the state information is updated, the volume manager returns the appropriate value to the application that initiated the read access. It is noted that, although zeros are written to the region in this example, other embodiments can write other default values to the region.

Returning to FIG. 4B, if a write access is addressed to an invalid region of the volume, as detected at 470, the write access is performed to the region of each mirror, as shown at 475. If the write access is a partial write (e.g., if the write access updates less than all of the region), the remaining portions of the region are filled with zeros. After performance of the write access, each mirror has the same value of the region, and thus the redundant data is synchronized with the application data in the region. The state information is then updated to indicate that the region is valid, as shown at 480.

FIG. 5A is a flowchart of a method of tracking the valid regions of a RAID 5 volume (it is noted that a similar method can be used to track the valid regions of other types of RAID volumes). At 505, a RAID 5 volume is created. In this embodiment, the RAID 5 volume is not synchronized (e.g., by reading the initial value of application data in each region of the volume, calculating the parity for each region, and then writing the calculated parity back to the volume) when the RAID 5 volume is created.

In this example, each region corresponds to one stripe of the RAID 5 volume (a stripe is the unit of data for which parity is calculated). Thus, whenever a region is written, one parity calculation is performed. It is noted that in other embodiments, a region can include only a portion of a stripe or all or part of multiple stripes. The number of parity calculations performed for a given region will depend on the number of stripes included in the region. Is a region includes only a portion of a stripe, one or more other regions may need to be accessed to perform a parity calculation for that region. It is also noted that in other embodiments, several sets of redundant data can be maintained for the volume (e.g., in RAID 6 implementations or implementations that maintain more than one parity column), and the number of parity calculations performed for a given region will depend on the number of sets of redundant data and the specifics of the redundancy techniques that are used for the volume.

At 510, state information associated with the volume is initialized to a value that indicates that each region of the volume is currently invalid. As noted above, the state information is initialized at the substantially the same time as the creation of the volume in some embodiments.

If a read access to an invalid region of the volume is detected, as indicated at 515, the value of the region is read (at 520) from the volume. The value of the entire region is used to calculate the parity for the region. The calculated parity is then written to the volume, effectively synchronizing the application data in the region with the associated redundant data. After the parity is written to the volume, the state information is updated to indicate that the region is valid, as shown at 525. Then, at 530, the requested data is returned to the application that generated the read request.

If a write access to an invalid region of the volume is detected, as detected at 535, the write access is performed to the region and the parity associated with the application data in the region is updated based on the value that is written. If the write is a full write (i.e., if the write access updates all of the application data within the region), the parity is calculated without needing to read any values from the volume, as shown at 540-545. In other words, the parity is calculated from the data values being written. The parity is then written to the volume. The state information is then updated to indicate that the region is valid, at 550.

If the write is a partial write (i.e., if the write access updates less than all of the application data in the region), the original value of the region (or of the portions of the region that are not affected by the write access) is read from the volume, as shown at 540 and 555. The new value being written to the region is overlaid on the original value, and the resulting value is used to calculate the parity of the region. The calculated parity is then written to the volume. Once the parity has been updated based on the write access, the state information is updated to indicate that the region is valid, as shown at 550.

FIG. 5B is a flowchart of another method of tracking the valid regions of a RAID 5 volume (it is noted that a similar method can be used to track the valid regions of other types of RAID volumes, as described above). At 550, the RAID 5 volume is created. In this example, the volume manager controls access to the volume such that each bit of the volume has an initial value of zero, as described below. However, the write activity to write a value of zero to each bit of the volume is not performed when the RAID 5 volume is created. Instead, synchronization of the parity with the application data in a particular region is delayed until the first time that the particular region is accessed. At 555, state information associated with the RAID 5 volume is initialized to a value, which identifies each region of the RAID 5 volume as being invalid (function 555 is performed at the same time as function 550 in some embodiments).

If a read access to an invalid region of the volume is detected at 560, zeros are returned to the application that initiated the read access, as indicated at 565. The read access can complete without actually accessing the volume. In the illustrated embodiment, performance of the read access does not cause the region to be validated. However, in alternative embodiments, in response to (or as part of) the read access, zeros are written to the region, appropriate parity values (e.g., all zeros or all ones, depending on the type (e.g., even or odd) of parity selected and number of columns used to calculate parity) are generated and written to the volume, and the state information is updated to indicate that the region is valid. After the state information is updated, the zeros are returned to the application.

If a write access to an invalid region of the volume is detected at 570, the write access is performed to the volume, the parity for the region is updated based on the value being written, and the state information for the region is updated to indicate that the region is valid. In particular, if the write access is a full write (i.e., if the write access updates all of the application data within the region), the parity is calculated from the value being written, and the calculated parity is then written to the volume, as shown at 575 and 580. There is no need to read the original value of the region in order to perform the parity calculation. After the parity is written to the volume, the state information is updated to indicate that the region is valid, as indicated at 590.

If the write access is a partial write (i.e., if the write access updates less than all of the application data within the region), the portions of the region that are not updated by the write access are filled with zeros, as shown at 575 and 585. Similarly, the parity of the region is calculated based on the new value and the filled-in zeros. It is noted that the original value of the region does not need to be read from the volume in order to perform the parity calculation, since it is known that the portions of the region that are not updated by the write access will be filled with zeros. The calculated parity is written to the volume, and the state information is updated to indicate that the region is a valid region, as indicated at 590. In some embodiments, a default value other than zeros can be used to initialize the volume.

It is noted that the processes performed in FIGS. 4A-4B and 5A-5B can be performed at the same time that a newly created volume is being initialized (e.g., by a process that reads each region of the volume). The initialization process can be considered as simply another user process, which initializes the volume by reading every region, and thus the initialization process will cause the read/write-back behavior explained above in FIGS. 4A-4B and 5A-5B. Accordingly, the initialization process can happen simultaneously with and overlap with regular application I/O to the volume.

In each of FIGS. 4A-4B and 5A-5B, the state information associated with a volume is initialized. It is noted that the initialization of the state information can be delayed using the same techniques used to delay the initialization of the volume. For example, in some embodiments, the totality of state information for all regions of a volume is collected into a summary data structure. In such embodiments, the initialization of the individual regions' state information is handled on an as-needed basis, using the same techniques described above. For example, another second set of state information, which indicates which regions of the first set of state information (which indicates valid regions of the volume) are valid, can be maintained. Accesses to the first set of state information can be handled in the same manner that accesses to the volume are handled, as shown above in FIGS. 4A-4B. It is noted that these sets of state information may not include redundant data, and thus no synchronization may be needed. In such embodiments, each time an invalid region of the first set of state information is accessed, the corresponding portion of the second set of state information is updated to indicate that the accessed region of the first set of state information is now valid (without the need to synchronize redundant data). In some embodiments (e.g., embodiments having extremely large volumes), more than two sets of hierarchical state information can be maintained. The set of state information at the top of the hierarchy can be initialized using a single fast I/O operation, and the initialization of the successive sets of state information can be delayed using the techniques described above.

It is also noted that the state information can be initialized by other applications, in addition to and/or instead of a volume manager. For example, the state information can be initialized by a file system that is using the volume. The state information indicates that a particular region is valid if the application has stored valid data within that particular region.

Using State Information to Initialize Redundant Data

The state information associated with a volume can also be used when performing initial synchronization of redundant data with the volume. Instead of accessing the entire volume when generating the values of the redundant data, only the valid regions of the volume are accessed when synchronizing the redundant data. For example, if the redundant data is a duplicate copy (e.g., a mirror or replica), only the valid regions of the volume are copied to the duplicate copy. Similarly if the redundant copy is a set of parity information (e.g., a parity column in RAID5), instead of computing parity values for the entire volume, parity values are only calculated for the valid regions of the volume. If a portion of the volume is invalid when the initial synchronization of the redundant data begins, unnecessary copying and/or processing can be avoided by only synchronizing the redundant data with the valid regions of the volume.

There are several ways in which redundant data can be created. For example, replication can be used to create a duplicate volume, referred to herein as a replica volume, at a remote site. If the redundant data is located in the same vicinity as the original volume, the redundant data can be created using various RAID techniques, such as mirroring or RAID 5.

Figure 6:
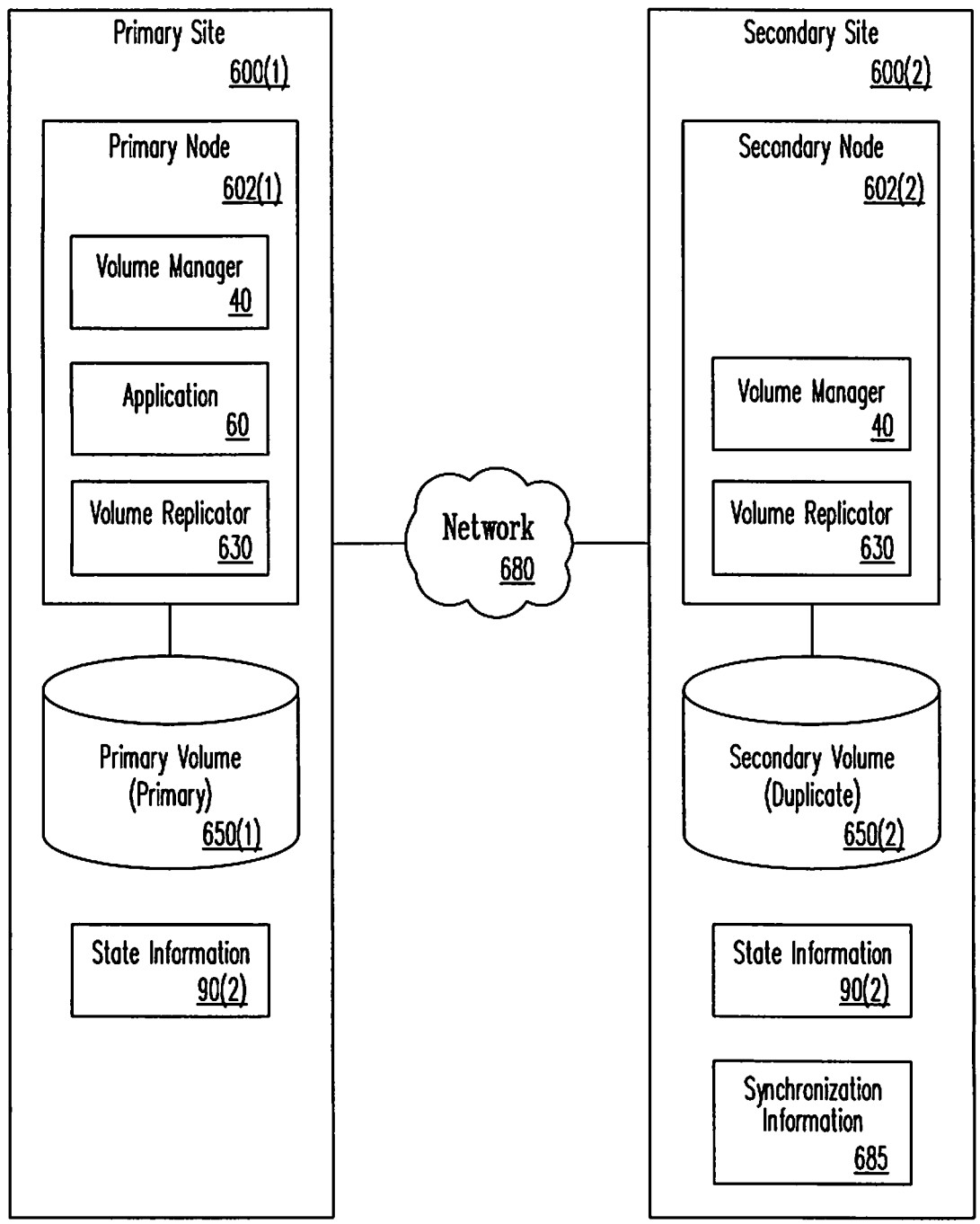
FIG. 6 shows a system that performs replication, according to one embodiment of the present invention.

FIG. 6 illustrates an example of a system that creates a duplicate copy of a volume through replication. The system includes a primary site 600(1) and a secondary site 600(2). Site 600(1) includes at least one primary node 602(1), which implements the functionality of volume manager 40, application 60, and volume replicator 630 (in one embodiment, volume replicator 630 is a component of volume manager 40). Site 600(1) also includes working volume 650(1). Site 600(2) includes at least one secondary node 602(2), which implements the functionality of volume manager 40, and a secondary volume 650(2). Secondary volume 650(2) is a duplicate copy of primary volume 650(1). Primary site 600(1) and secondary site 600(2) are coupled by network 680. Network 680 can include a WAN (Wide Area Network), such as the Internet, one or more LANs (Local Area Networks), and/or one or more SANs (Storage Area Networks). In one embodiment, each node 602(1) and 602(2) is implemented as a computing device such as the one shown in FIG. 1.

Volume replicator 630 replicates data included in primary volume 650(1) on one or more secondary volumes 650(2) (for simplicity, only one such secondary volume is illustrated). While FIG. 6 illustrates a system configured to replicate a single data volume, other embodiments support replication of multiple data volumes. Furthermore, in some embodiments, there are multiple secondary volumes 650(2) to which volume replicator 630 replicates data in primary volume 650(1).

Volume replicator 630 is configured to maintain secondary volume 650(2) as a replica of primary volume 650(1). Volume replicator 630 monitors activity that modifies primary volume 650(1) (e.g., write activity initiated by application 620). If modifications to primary volume 650(1) are detected, volume replicator 630 causes those modifications to be applied to secondary volume 650(2). For example, if application 620 writes to a block of primary volume 650(1), volume replicator 630 can cause the same write to be performed to the corresponding block of secondary volume 650(2) by communicating information indicating the change (e.g., the address, the write command, and the new value of the block) across network 680 to secondary site 600(2).

Volume replicator 630 can perform replication using various different replication techniques (or a combination of such techniques). One replication technique involves synchronous replication. During synchronous replication, write accesses to the primary volume are replicated to the secondary volume as those write accesses occur. A write access will not complete until the write data has been sent to the secondary site.

Another replication technique involves periodic replication. In periodic replication, volume replicator 630 records changes to the primary volume for a particular period. At the end of that period, volume replicator 630 begins recording changes that occur during a new period. During the new period, the changes recorded during the previous period are applied to the secondary volume.

Yet another replication technique involves asynchronous replication. This technique involves replicating individual changes in the order those changes were made to the primary volume. A change caused by a given operation, such as a write initiated by application 620, can be communicated to secondary site 600(2) after the given write operation has already completed on primary volume 650(1), and thus the replication of the change is asynchronous with the completion of the operation that causes the change.

Volume manager 40 on node 602(1) maintains state information 90(1) that indicates which regions of primary volume 650(1) are currently valid. Similarly, volume manager 40 on node 602(2) maintains state information 90(2), which indicates which regions of secondary volume 650(2) are currently valid. State information 90(1) and 90(2) can be maintained and used as described above (e.g., according to one or more of the methods illustrated in FIGS. 4A, 4B, 5A, and 5B). While the above examples show state information that is maintained for volumes that include redundant data, it is noted that in some embodiments, primary volume 650(1) and/or secondary volume 650(2) do not include redundant data. In one embodiment, if a particular volume does not include redundant data, the state information for that volume indicates that a particular region is valid if that region has been accessed (e.g., read and/or written) by application 60.

Volume replicator 630 also uses state information 90(1) when initializing secondary volume 650(2). In particular, volume replicator 630 copies only those regions from primary volume 650(1) to secondary volume 650(2) that are identified as being valid by state information 90(1).

When primary volume 650(1) is created, state information 90(1) is initialized to a value that indicates that each region of primary volume 650(1) is invalid. As application 60 accesses regions of primary volume 650(1), invalid regions can be transformed into a state in which those regions store valid data (e.g., by synchronizing application data in those regions with corresponding redundant data, if any, in primary volume 650(1) and updating state information 90(1) to identify those regions as being valid).

Similarly, when secondary volume 650(2) is created, state information 90(2) is initialized to a value that indicates that each region of secondary volume 650(2) is invalid. As each valid regions of primary volume 650(1) are copied to secondary volume 650(2), state information 90(2) is updated to indicate that the corresponding region of secondary volume is valid.

In the illustrated embodiment, volume replicator 630 (or, alternatively, volume manager 40) also maintains synchronization information 685. Synchronization information 685 identifies whether secondary volume 650(2) has been initially synchronized with primary volume 650(1) subsequent to creation of secondary volume 650(2). When secondary volume 650(2) is created, synchronization information 685 is initialized to a value that indicates that secondary volume 650(2) has not yet been synchronized with primary volume 650(1). For example, in one embodiment, synchronization information 685 is a single bit, and when secondary volume 650(2) is created, the bit is set to a value of binary one. While synchronization information 685 indicates that secondary volume 650(2) is not synchronized with primary volume 650(1), the data in secondary volume 650(2) will be treated as invalid data. Accordingly, application access to secondary volume 650(2) will be prevented and secondary volume 650(2) will not be used to restore primary volume 650(1) while synchronization information 685 indicates that secondary volume 650(2) is not synchronized with primary volume 650(1).

Volume replicator 630 copies the valid regions of primary volume 650(1), as identified by state information 90(1), to secondary volume 650(2). Copying the valid regions to secondary volume 650(2) can involve copying the valid regions via network 680. Alternatively, volume replicator 630 can copy the valid regions of volume 650(1) to disk (e.g., by attaching a mirror to volume 650(1)), to tape, or to another persistent storage device. If less than all of the regions of primary volume 650(1) are copied (e.g., because some regions of primary volume 650(1) are invalid), information (such as state information 90) identifying the valid regions can also be copied to the disk or tape. The disk or tape can then be transported to secondary site 600(2), and the contents of the disk or tape can then be applied to secondary volume 650(2).

If less than all of the regions of primary volume 650(1) are valid, the amount of data that needs to be copied to secondary volume 650(2) is reduced. For example, if primary volume 650(1) is several Terabytes in size, but state information 90(1) indicates that only a 2 Gigabytes of primary volume 650(1) are valid at the time that secondary volume 650(2) is created, only the 2 Gigabytes of valid data (as opposed to the entire contents of primary volume 650(1)) need to be copied to the secondary volume. Accordingly, the amount of data that needs to be copied to secondary volume is much less than it would be if state information 90(1) were not maintained. This can reduce the time taken to synchronize secondary volume 650(2) with primary volume 650(1) (e.g., if the copying is performed via a network). Additionally, the amount of resources (e.g., network bandwidth, disk space, and/or tape size) needed to perform the synchronization between primary volume 650(1) and secondary volume 650(2) can be reduced.

Once the valid regions of primary volume 650(1) have been copied to secondary volume 650(2), synchronization information 685 is updated to indicate that secondary volume 650(2) has been initially synchronized with primary volume 650(1). For example, if synchronization information 685 is a single bit, the bit can be cleared (e.g., updated to have a value of binary zero). Once synchronization information 685 indicates that secondary volume 650(2) is synchronized with primary volume 650(1), secondary volume 650(2) can be used by an application and/or used to restore primary volume 650(1).

Even after secondary volume 650(2) is synchronized with primary volume 650(1), there may still be some regions of both volumes that are invalid. In some embodiments, when an invalid region of primary volume 650(1) is accessed by application 60, and if the access causes the invalid region of the primary volume to become valid (e.g., as described above with respect to FIGS. 4A, 4B, 5A, and/or 5B), the entire value of the accessed region of primary volume 650(1) is copied to secondary volume 650(1), even if less than all of the region was actually accessed. In contrast, if a valid region of primary volume 650(1) is accessed, and if the contents of that region have already been copied to secondary volume 650(2), only the portions of the region that are modified by the access (if any) are copied to secondary volume 650(2).

Figure 7:
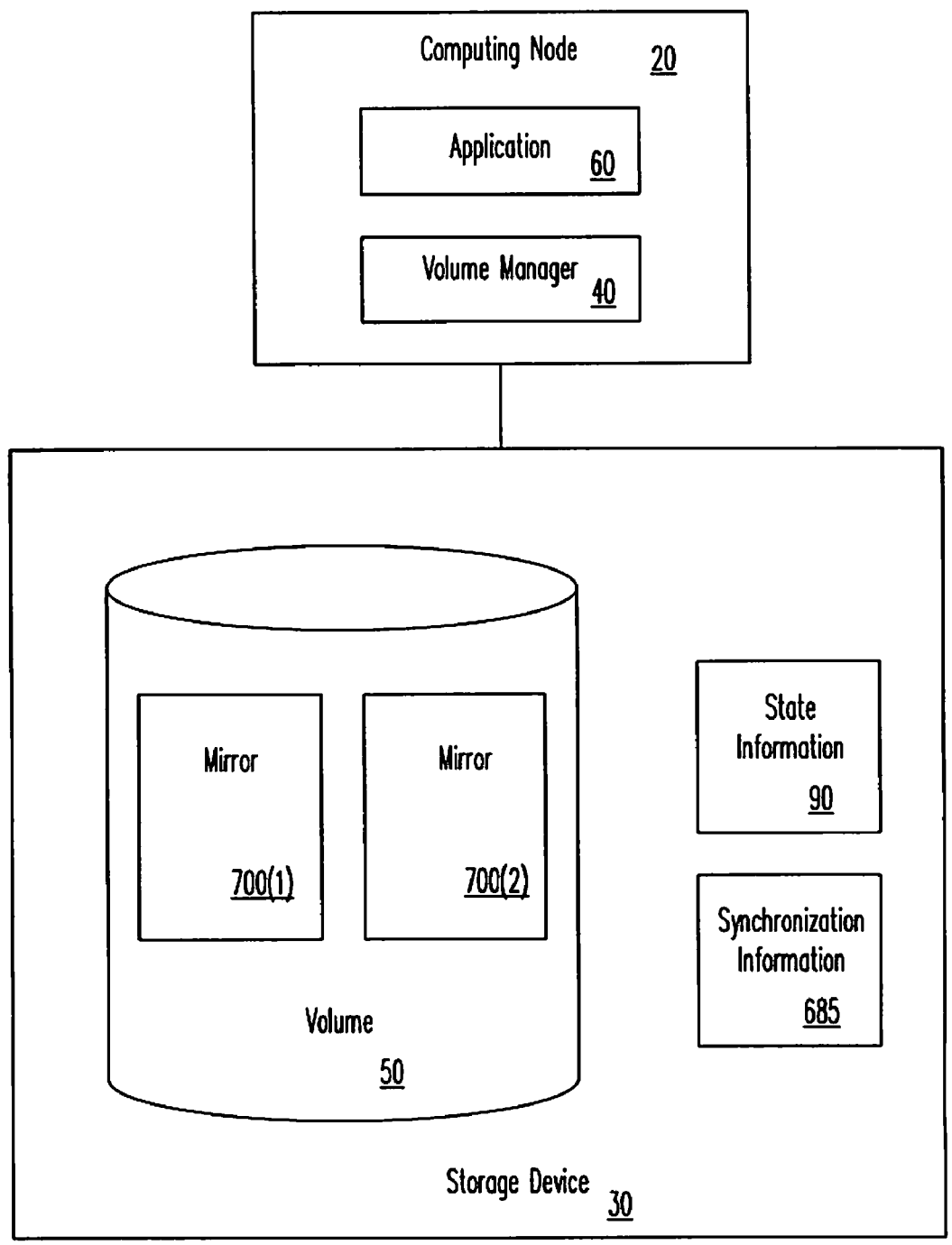
FIG. 7 shows a system that includes a mirrored volume, according to one embodiment of the present invention.

FIG. 7 illustrates a system that creates a duplicate copy of volume through mirroring. The system shown in FIG. 7 is similar to the system shown in FIG. 1, and like-numbered components of FIGS. 1 and 7 perform similar functions. As shown, volume 50 includes two mirrors, mirror 700(1) and mirror 700(2). Mirror 700(2) is a duplicate copy of mirror 700(1). State information 90 identifies the valid regions of volume 50.

In this example, mirror 700(2) is created subsequent to the creation of mirror 700(1) (mirror 700(2) is created by "attaching" a new mirror to existing volume 50). When mirror 700(1) is created, state information 90 is initialized to a value that identifies each region of mirror 700(1) as being invalid. It is noted that at the time mirror 700(1) is created, there may not be any other mirrors in volume 50, and thus volume 50 may not be a mirrored volume at that time (i.e., when volume 50 is created, what is referred to as "mirror" 700(1) may actually be a single plex of a non-mirrored volume).

During the interval between the creation of mirror 700(1) and the creation of mirror 700(2), application 60 can access volume 50, causing certain regions of mirror 700(1) to store valid application data. State information 90 is updated in response to these accesses (e.g., each time a region of mirror 700(1) is accessed, the state information can be updated to indicate that the accessed region is valid). When mirror 700(2) is subsequently created, the values stored in mirror 700(2) are not synchronized with the values stored in mirror 700(1). Additionally, the value of state information 90 is irrelevant to mirror 700(2) until mirror 700(2) is synchronized with mirror 700(1) (when mirror 700(2) is initially created, all regions of mirror 700(2) are invalid, regardless of whether some regions of mirror 700(1) are valid).

In addition to maintaining state information 90 for volume 50, volume manager 40 also maintains synchronization information 685. Like the synchronization information maintained in the replication system of FIG. 6, synchronization information 685 indicates whether the duplicate copy (here, mirror 700(2)) has been initially synchronized with the original volume. If mirror 700(2) is not created at the same time as mirror 700(1), synchronization information 685 is set to a value (e.g., binary one, if synchronization information 685 is a single bit) that indicates that mirror 700(2) is not synchronized with mirror 700(1). While synchronization information 685 indicates that mirror 700(2) is not synchronized with mirror 700(1), the data in mirror 700(2) is treated as being invalid and is not used by application 60.

Volume manager 40 copies the regions identified as being valid by state information 90 from mirror 700(1) to mirror 700(2) (invalid regions, as identified by state information 90, do not need to be copied). When all of the valid regions have been copied from mirror 700(1) to mirror 700(2), volume manager 40 updates synchronization information 685 to indicate that mirror 700(2) is synchronized with mirror 700(1). It is noted that the valid regions can be copied directly from mirror 700(1) or from a point-in-time copy (e.g., a snapshot or backup) of mirror 700(1).

After mirror 700(2) has been synchronized with mirror 700(1) (as indicated by the change in value of synchronization information 685), the value of state information indicates the state of corresponding regions of both mirror 700(1) and mirror 700(2). Subsequent accesses to volume 50 can be handled as described above (e.g., in FIGS. 4A and/or 4B).

Figure 8:
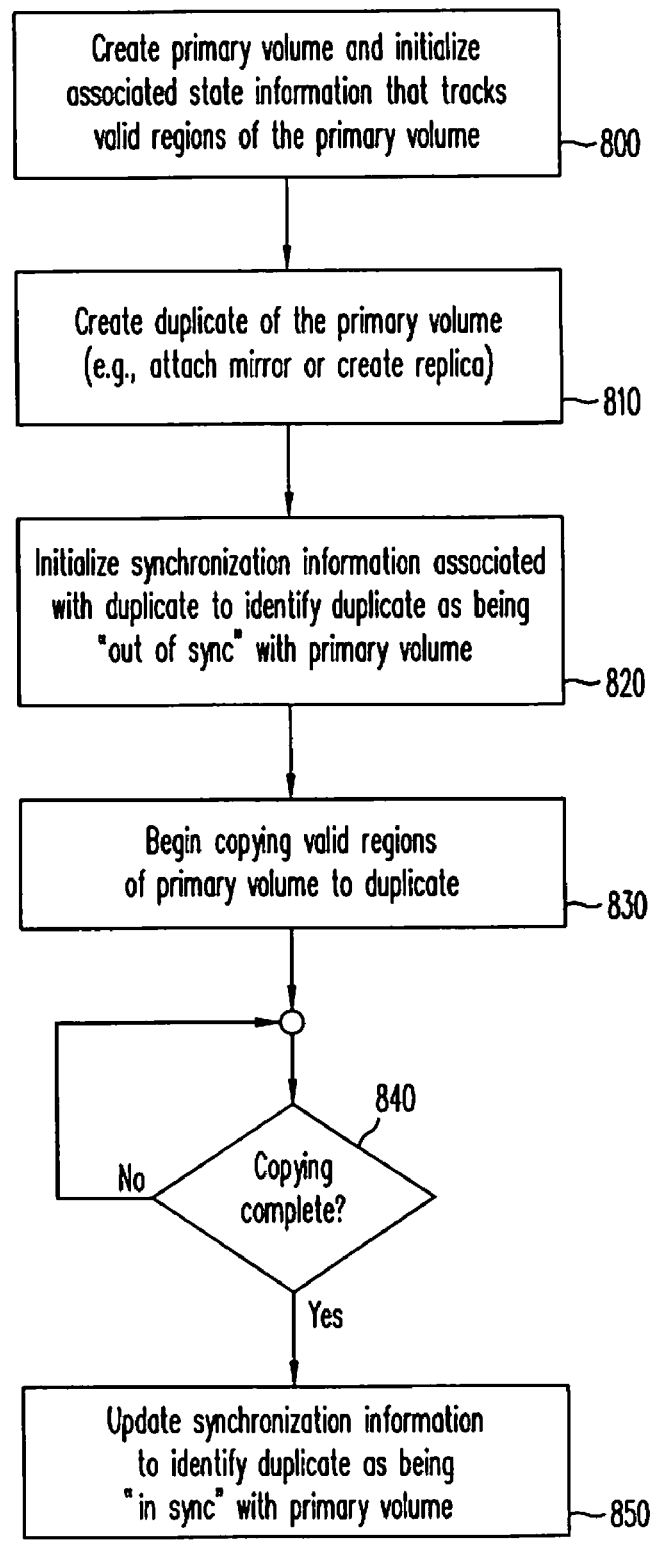
FIG. 8 is a flowchart of a method of initializing a duplicate copy of a volume, according to one embodiment of the present invention.

FIG. 8 is a flowchart of a method of using state information when performing the initial synchronization of a duplicate copy with a primary volume. At 800, the primary volume is created. State information that tracks the valid regions of the primary volume is initialized to a value that indicates that all of the regions of the primary volume are invalid. As the primary volume is accessed by an application, the accessed regions of the primary volume that were invalid can be transformed into valid regions (e.g., due to the values stored in those regions being modified due to application write requests), and the state information is updated to indicate that those regions are now valid.

At 810, a duplicate copy of the primary volume is created. Creating the duplicate copy can involve attaching a mirror to the primary volume or creating a replica of the primary volume at a remote site. When the duplicate copy is created, each region of the duplicate copy can be identified as being invalid (e.g., by updating state information associated with the duplicate copy to indicate that each region of the duplicate copy is currently invalid). If the duplicate copy is created after an application has begun accessing the primary volume, the duplicate copy will not be in complete synchronization with the primary volume. Thus, at 820, synchronization information associated with the duplicate copy is initialized to a value that indicates that the duplicate copy is "out of sync" with respect to the primary volume.

The valid regions of the primary volume, as identified by the state information associated with the primary volume, are copied from the primary volume to the duplicate copy. This copying process begins at 830. Invalid regions of the primary volume do not need to be copied, and thus unnecessary copying can be avoided. As noted above, copying the valid regions of the primary volume to the duplicate copy can involve directly copying the valid regions (e.g., by transferring the value of each valid region to the duplicate copy via a network). Alternatively, the copying can be performed by copying the valid regions to an intermediate storage device, such as a disk or tape, and then copying those valid regions from the disk or tape to the duplicate copy. It is noted that in some embodiments, copying the valid regions of the primary volume to the duplicate copy involves copying the valid regions of a point-in-time copy (e.g., created at the time the duplicate copy is created) of the primary volume to the duplicate copy.

If separate state information is maintained for the duplicate copy (e.g., as shown in the example of FIG. 6), the state information associated with the duplicate copy is updated as regions of the primary volume are copied to the duplicate copy. Each time the full value of a particular region of the primary volume is written to the duplicate copy, the state information associated with the duplicate copy is updated to indicate that the corresponding region of the duplicate copy is now valid. If the duplicate copy includes redundant information (e.g., if the duplicate copy is a RAID volume), the state information associated with the duplicate copy is not updated until the redundant information associated with that region of the duplicate copy is synchronized with the value copied from the primary volume.

When all of the valid regions of the primary volume (or a point-in-time copy of the primary volume) have been copied to the duplicate copy, as determined at 840, the synchronization information is updated to indicate that the duplicate copy is now "in sync" with respect to the primary volume, as shown at 850.

While the initial synchronization of the duplicate copy with respect to the primary volume is being performed, accesses to the primary volume are handled using the techniques described above (e.g., as shown in FIGS. 4A-5B). Accordingly, the state information associated with the primary volume can be updated to indicate that additional regions (which were previously identified as invalid) of the primary volume are valid, while the initial synchronization is being performed. The data stored in these newly-valid regions is copied to the duplicate copy as part of the initial synchronization process.

Figure 9:
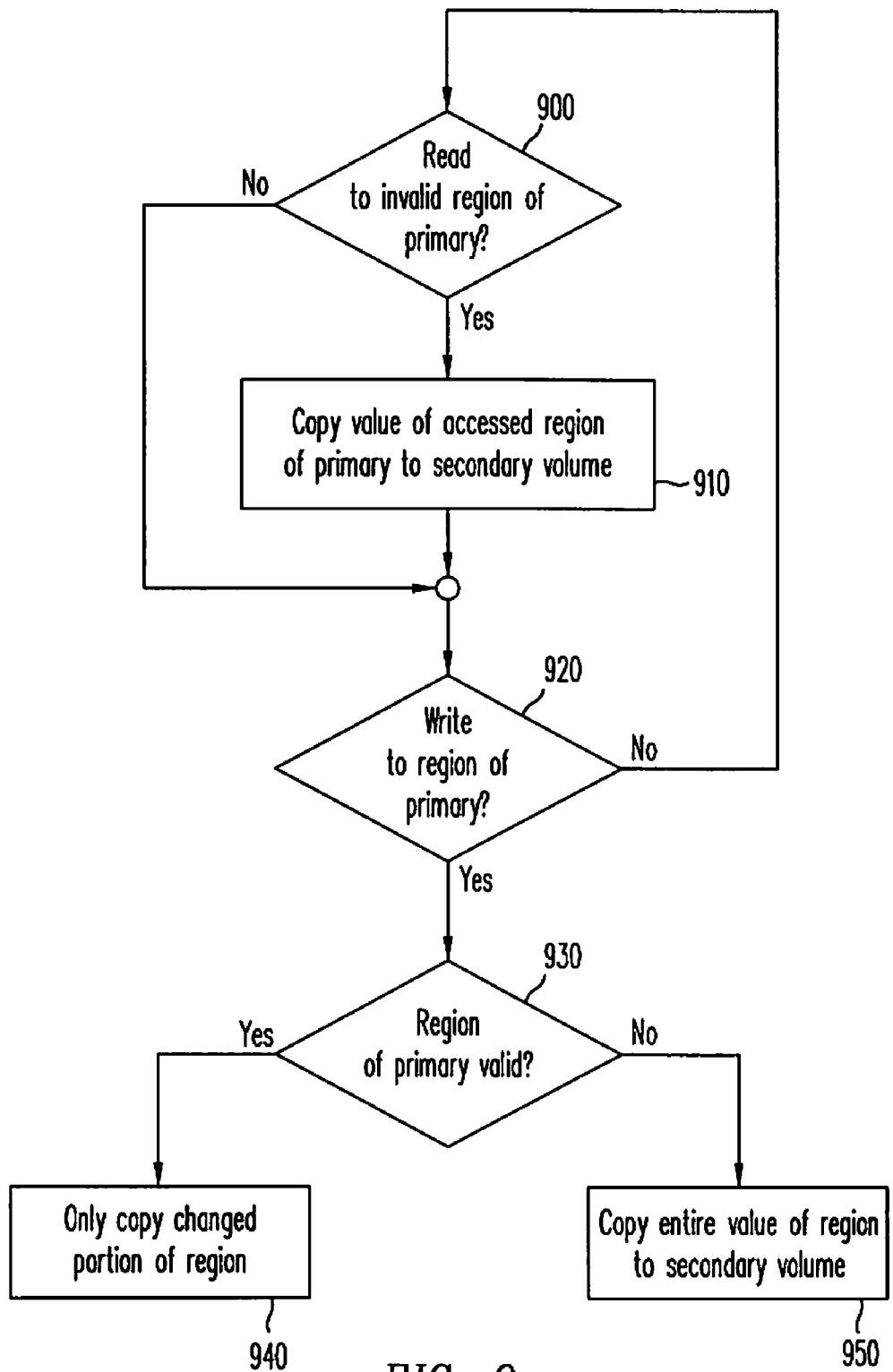
FIG. 9 is a flowchart of a method of replicating data to the duplicate copy in response to accesses to the original, according to one embodiment of the present invention.

FIG. 9 is a flowchart of a method of handling accesses being made to a primary volume while the initial synchronization is being performed. The method of FIG. 9 can be performed while initial synchronization of the secondary volume with respect to the primary volume is being performed. Additionally, the method of FIG. 9 can be performed after the initial synchronization completes, in order to replicate accesses to the primary volume that cause previously invalid regions of the primary volume to become valid.

At 900, a read access to an invalid region of the primary volume is detected. If, as part of the read access, the state information associated with the accessed region of the primary volume is updated to indicate that the access region is now valid, the value of the accessed region is applied to the secondary volume, as shown at 910 (this function can be performed as part of the initial synchronization process illustrated in FIG. 8 if the region is accessed while initial synchronization is being performed). Applying the value of the accessed region to the secondary volume involves either copying the data in the accessed region to the secondary volume, as shown in FIG. 9, or writing zeroes to the corresponding region of the secondary volume (e.g., if the primary volume is initialized to zero).

If a write access to a region of the primary is detected at 920, at least a portion of the updated value of the accessed region will be applied to the secondary volume. In particular, if the accessed region of the primary volume is valid prior to the write access, as determined at 930, only the changed portion of the accessed region is copied to the secondary volume (at 940) (although it is noted that in alternative embodiments, the entire value of the region can be copied). If instead the accessed region of the primary volume is invalid prior to the write access, the entire value of the accessed region is copied to the secondary volume (at 950), even if the write access modified less than all of the region. Functions 940 and/or 950 can be performed as part of the initial synchronization process of FIG. 8 if the write access is detected while the initial synchronization is being performed.

It is noted that while the above description has focused on the initial synchronization of duplicate copies of a volume with respect to the volume, other embodiments use similar techniques to perform initial synchronization of other types of redundant data with respect to a volume. Various types of redundant data, such as duplicate copies or parity, are used to add a redundancy level to a volume. For example, adding a mirror to a volume or creating a replica of a volume adds a redundancy level to the volume. Similarly, adding a set of parity information (e.g., as calculated according to various RAID techniques) to a volume adds a redundancy level to the volume. For example, a redundancy level can be added to a RAID 5 volume by adding a new set of parity information to the volume (e.g., the new set of parity information can be calculated in such a way that the RAID 5 volume is transformed into a RAID 6 volume). Redundancy levels can be added to volumes that already include one or more sets of redundant data (e.g., a mirror can be added to a RAID 5 volume) as well as to volumes that do not include redundant data (e.g., a striped volume can be converted to a RAID 4 volume by adding of a parity column to the striped volume).

As noted above, one way to add a redundancy level to a volume is to add an additional set of parity information (e.g., a new parity column) to the primary volume in order to provide additional fault tolerance on the primary volume. If this additional set of parity information is added after an application has already begun accessing the primary volume, techniques similar to those shown in FIGS. 8 and 9 can be used to perform initial synchronization of the new set of parity information with respect to the primary volume. These above-described techniques are modified (e.g., as shown in FIG. 10) so that the values of the valid regions of the primary volume are used to calculate the appropriate value of appropriate portions of the new set of parity information.

Figure 10:
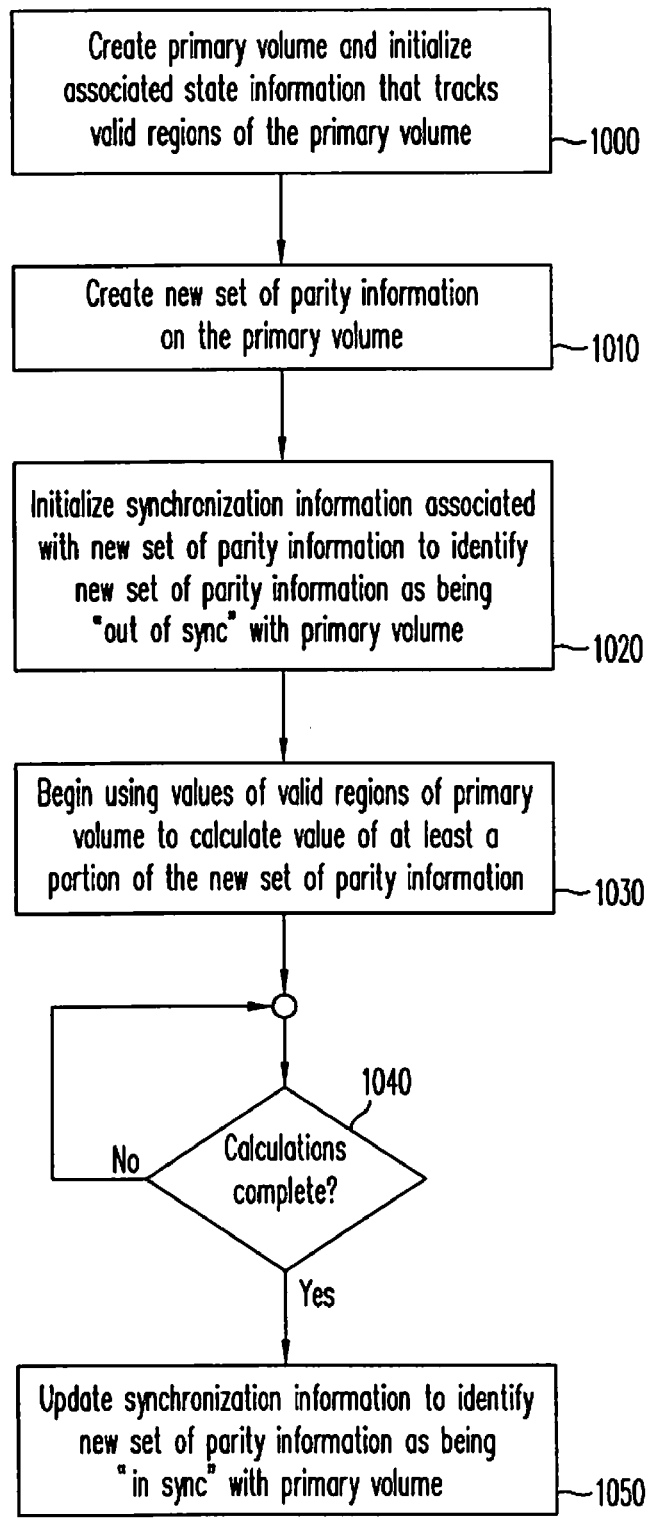
FIG. 10 is a flowchart of a method of initializing a new set of parity information that has been added to a volume, according to one embodiment of the present invention.

FIG. 10 is a flowchart of a method of performing initial synchronization of a set of parity information with a volume, when the new set of parity information is created after an application has already begun accessing the volume. Many of the functions of FIG. 10 are similar to functions of FIG. 8.

A primary volume is created, as shown at 1000. State information that is associated with the primary volume is initialized. The state information tracks valid regions of the primary volume.

At 1010, a new set of parity information is created on the primary volume. For example, a new parity column can be added to a non-RAID volume. Alternatively, an additional parity column can be added to a volume that already includes one or more sets of parity information. The new set of parity information can be added to the primary volume after an application has already begun accessing the primary volume. As a result, some the state information may already indicate that some regions of the primary volume are valid at the time that the new set of parity information is created.

At 1020, synchronization information associated with the new set of parity information is initialized to a value that indicates that the new set of parity information is "out of sync" with respect to the primary volume. While the synchronization information identifies the new set of parity information as being out of sync, the new set of parity information will not be used to detect errors in and/or recover application data stored in the primary volume.

Calculation of the value of at least a portion of the new set of parity information is initiated at 1030. As shown, the values of all of the valid regions of the primary volume are used in the calculation. The values of invalid regions of the primary volume may not be used in the calculations. Performing the calculation involves calculating one or more parity values. For example, for each row of the primary volume that includes at least one valid region (or a portion of a valid region), a corresponding parity value can be calculated and stored in the new set of parity information. It is not necessary to perform calculations for portions (e.g., rows) of the primary volume that only include invalid regions. Accordingly, some unnecessary calculations can be avoided during the initial synchronization of the new set of parity information with the primary volume.

Once the calculations have been performed for all of the valid regions in the primary volume, as determined at 1040, the synchronization information is updated to indicate that the new set of parity information is now synchronized (i.e., "in sync") with respect to the primary volume. At this point, the new set of parity information can be used to detect errors in and/or recover application data stored in the primary volume. Subsequent accesses to the primary volume can be handled as described above (e.g., with respect to FIGS. 5A and 5B).

Figure 11:
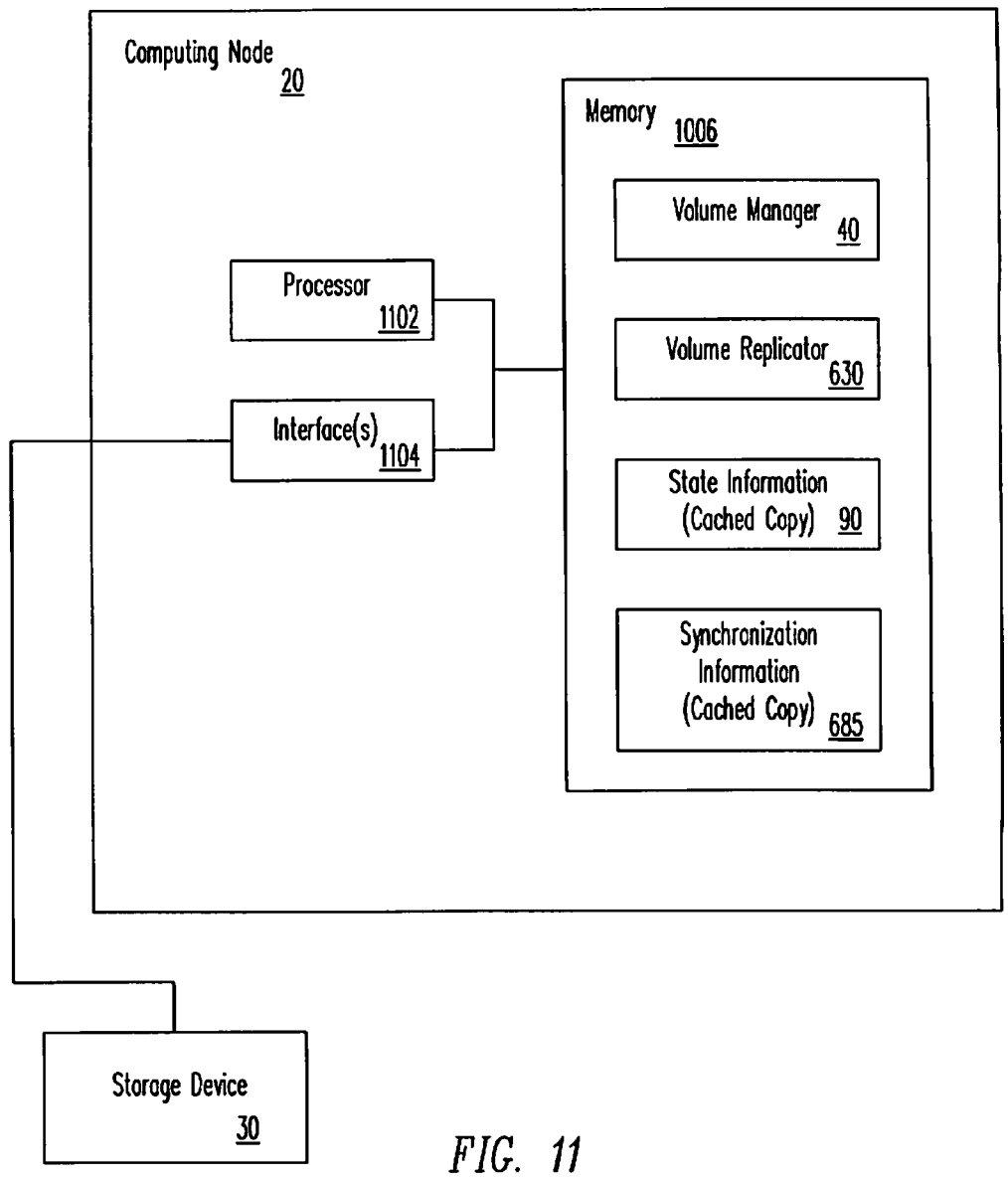
FIG. 11 is a block diagram of a computing node, according to one embodiment of the present invention.

FIG. 11 is a block diagram of computing node 20. Computing node 20 includes one or more processors 1102, one or more interfaces 1104, and memory 1106. Processor 1102 executes program instructions stored in memory 1106. Interface 1104 provides access to storage device 30. Additional interfaces (not shown) can also provide access to various other peripheral devices and/or networks.

Memory 1106 stores program instructions executable to implement volume manager 40 and/or volume replicator 630. Volume manager 40 is configured to present one or more virtualized volumes and to maintain state information for each volume. Volume manager 40 uses the state information as described above (e.g., using all or some of the methods described in reference to FIGS. 4A, 4B, 5A, and 5B). Volume manager 40 can also maintain redundant data for the volume (e.g., in the form or mirrors or parity) and can perform initial synchronization of this redundant data with the volume (e.g., using techniques such as those shown in FIGS. 8 and 10). Volume replicator 630 operates to create and maintain a duplicate copy of a primary volume presented by volume manager 40. Volume manager 630 can use state information and/or synchronization information, as described above, when synchronizing the duplicate copy with the primary volume. It is noted that some alternative embodiments do not include volume replicator 630 (e.g., if replication to a remote site is not desired).

Memory 1106 also provides a temporary storage space for all or part of state information 90 for each volume. For example, volume manager 40 can cache recently-accessed portions of state information 90 within memory 1106 (a copy of state information 90 is also maintained on a persistent storage device such as storage device 30). Likewise, memory 1106 can also provide a temporary storage space for synchronization information 685 for each duplicate volume (as with state information 90, a copy of synchronization information 685 is also maintained on a persistent storage device).

As shown in FIG. 11, program instructions and data implementing volume manager 40 and/or volume replicator 630 can be stored on various computer readable media such as memory 1106. In some embodiments, such software is stored on a computer readable medium such as a CD (Compact Disc), DVD (Digital Versatile Disc), hard disk, optical disk, tape device, floppy disk, and the like). In order be executed by processor 1102, the instructions and data implementing volume manager 40 and/or volume replicator 630 are loaded into memory 1106 from the other computer readable medium. Such instructions and/or data can also be transferred to computing node 20 for storage in memory 1106 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing volume manager 40 and/or volume replicator 630 are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:
    accessing state information associated with a volume, wherein the state information indicates which regions of the volume are valid regions;
    initiating synchronization of redundant data with one or more regions of the volume, in response to the state information indicating that the one or more regions of the volume are invalid when an application accesses the one or more regions, wherein
        the redundant data adds a redundancy level to the volume; and
    updating the state information associated with the volume to indicate that the one or more regions of the volume are valid regions, in response to the synchronization of the redundant data.

2. The method of claim 1, further comprising:
    identifying the redundant data as being out of synchronization with respect to application data in the volume, while the synchronization is performed.

3. The method of claim 2, wherein
    the redundant data is a set of parity information, and
    initiating synchronization comprises initiating calculation of at least one parity value based on the one or more regions of the volume.

4. The method of claim 2, wherein
    the redundant data is a duplicate copy of the volume, and
    initiating synchronization comprises initiating copying of the one or more regions of the volume to the duplicate copy of the volume.

5. The method of claim 4, wherein
    the duplicate copy of the volume is a mirror of the volume.

6. The method of claim 4, wherein
    the duplicate copy of the volume is a replica of the volume.

7. The method of claim 4, further comprising:
    identifying the duplicate copy as being in synchronization with respect to the application data in the volume in response to completion of the copying.

8. The method of claim 7, further comprising:
    inhibiting an application from accessing the duplicate copy while the duplicate copy is identified as being out of synchronization with respect to the application data in the volume.

9. The method of claim 4, wherein the initiating the copying comprises:
    initiating a transfer of a copy of each of the one or more regions from the volume to the duplicate copy via a network.

10. The method of claim 4, wherein the initiating the copying comprises:
    storing a copy of the one or more regions to a backup storage device; and
    sending the backup storage device to a remote site, wherein the duplicate copy is located at the remote site.

11. The method of claim 2, further comprising:
    modifying a region of the volume, wherein the modifying the region of the volume occurs before the redundant data is created.

12. The method of claim 2, further comprising:
allowing an application to access the volume during the synchronization of the redundant data with respect to the one or more regions of the volume.

13. A system comprising:
means for accessing state information associated with a volume, wherein the state information indicates which regions of the volume are valid regions;
means for initiating synchronization of redundant data with one or more regions of the volume, in response to the state information indicating that the one or more regions of the volume are invalid when an application accesses the one or more regions, wherein
the redundant data adds a redundancy level to the volume; and
means for updating the state information associated with the volume to indicate that the one or more regions of the volume are valid regions, in response to the synchronization of the redundant data.

14. The system of claim 13, further comprising:
means for identifying the redundant data as being out of synchronization with respect to application data in the volume, while the synchronization is performed.

15. The system of claim 14, wherein
the redundant data is a set of parity information, and
initiating synchronization comprises initiating calculation of at least one parity value based on the one or more regions of the volume.

16. The system of claim 14, wherein
the redundant data is a duplicate copy of the volume, and
initiating synchronization comprises initiating copying of the one or more regions of the volume to the duplicate copy of the volume.

17. A computer readable storage medium comprising program instructions executable to:
access state information associated with a volume, wherein the state information indicates which regions of the volume are valid regions;
initiate synchronization of redundant data with one or more regions of the volume, in response to the state information indicating that the one or more regions of the volume are invalid when an application accesses the one or more regions, wherein
the redundant data adds a redundancy level to the volume; and
update the state information associated with the volume to indicate that the one or more regions of the volume are valid regions, in response to the synchronization of the redundant data.

18. The computer readable storage medium of claim 17, wherein the program instructions are further executable to:
identify the redundant data as being out of synchronization with respect to application data in the volume, while the synchronization is performed.

19. The computer readable storage medium of claim 18, wherein
the redundant data is a set of parity information, and
initiating synchronization comprises initiating calculation of at least one parity value based on the one or more regions of the volume.

20. The computer readable storage medium of claim 18, wherein
the redundant data is a duplicate copy of the volume, and initiating synchronization comprises initiating copying of the one or more regions of the volume to the duplicate copy of the volume.

21. The computer readable storage medium of claim 20, wherein
the program instructions are executable to implement a volume replicator, and
the volume replicator is configured to copy all of a region of the volume to the duplicate copy in response to an access to region if, prior to the access, the state information indicates that the region is invalid, and
the volume replicator is configured to copy only a modified portion of the region of the volume to the duplicate copy in response to the access to the region if, prior to the access, the state information indicates that the region is valid.

22. A system comprising:
a processor; and
a memory coupled to the processor, the memory storing program instructions executable to:
access state information associated with a volume, wherein the state information indicates which regions of the volume are valid regions;
initiate synchronization of redundant data with one or more regions of the volume, in response to the state information indicating that the one or more regions of the volume are invalid when an application accesses the one or more regions, wherein
the redundant data adds a redundancy level to the volume; and
update the state information associated with the volume to indicate that the one or more regions of the volume are valid regions, in response to the synchronization of the redundant data.

23. The system of claim 22, wherein the program instructions are further executable to:
identify the redundant data as being out of synchronization with respect to application data in the volume, while the synchronization is performed.

24. The system of claim 23, wherein
the redundant data is a set of parity information, and
initiating synchronization comprises initiating calculation of at least one parity value based on the one or more regions of the volume.

25. The system of claim 23, wherein
the redundant data is a duplicate copy of the volume, and
initiating synchronization comprises initiating copying of the one or more regions of the volume to the duplicate copy of the volume.

26. The system of claim 25, wherein
the program instructions are executable to implement a volume replicator, and
the volume replicator is configured to copy all of a region of the volume to the duplicate copy in response to an access to region if, prior to the access, the state information indicates that the region is invalid, and
the volume replicator is configured to copy only a modified portion of the region of the volume to the duplicate copy in response to the access to the region if, prior to the access, the state information indicates that the region is valid.

* * * * *